US010897568B2

(12) United States Patent
Ueda et al.

(10) Patent No.: US 10,897,568 B2
(45) Date of Patent: Jan. 19, 2021

(54) ELECTRONIC DEVICE

(71) Applicant: CANON KABUSHIKI KAISHA, Tokyo (JP)

(72) Inventors: Haruhisa Ueda, Tokyo (JP); Jun Kamiya, Kawasaki (JP); Takahiro Akimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/453,662

(22) Filed: Jun. 26, 2019

(65) Prior Publication Data

US 2020/0007747 A1 Jan. 2, 2020

(30) Foreign Application Priority Data

Jun. 29, 2018 (JP) .................................. 2018-125512
May 15, 2019 (JP) .................................. 2019-092371

(51) Int. Cl.
*H04N 5/232* (2006.01)
*G06F 3/044* (2006.01)

(52) U.S. Cl.
CPC ......... *H04N 5/23216* (2013.01); *G06F 3/044* (2013.01); *H04N 5/23293* (2013.01)

(58) Field of Classification Search
CPC .............................................. H04N 5/23216
USPC ..................................................... 348/333.01
See application file for complete search history.

(56) References Cited

U.S. PATENT DOCUMENTS

| 8,766,940 | B1 | 7/2014 | Starner |
| 2002/0176016 | A1 | 11/2002 | Misawa |
| 2003/0043123 | A1 | 3/2003 | Hinckley |
| 2007/0097089 | A1 | 5/2007 | Battles |
| 2007/0273660 | A1 | 11/2007 | Xiaoping |
| 2010/0207908 | A1 | 8/2010 | Hinckley |
| 2012/0086564 | A1 | 4/2012 | Sinha |
| 2015/0185762 | A1* | 7/2015 | Magi ..................... G06F 1/1643 361/679.03 |
| 2017/0177140 | A1 | 6/2017 | Lee |

FOREIGN PATENT DOCUMENTS

| JP | 2006-092321 A | 4/2006 |
| JP | 2008-236765 A | 10/2008 |
| JP | 2012-10061 A | 1/2012 |
| JP | 2015-026220 A | 2/2015 |
| RU | 2007105876 A | 8/2008 |
| WO | 2005/057328 A2 | 6/2005 |
| WO | 2013/045766 A2 | 4/2013 |

* cited by examiner

*Primary Examiner* — Joel W Fosselman
(74) *Attorney, Agent, or Firm* — Canon U.S.A., Inc. IP Division

(57) ABSTRACT

In the present invention, first and second operation surfaces are different from each other in any one of amount of protrusion to a back surface side, texture, and color, and a first detection surface is provided over the first operation surface and the second operation surface provided adjacent to an outer edge of the first operation surface on a protruding portion side in a direction of a slide operation.

13 Claims, 19 Drawing Sheets

CROSS SECTION A-A

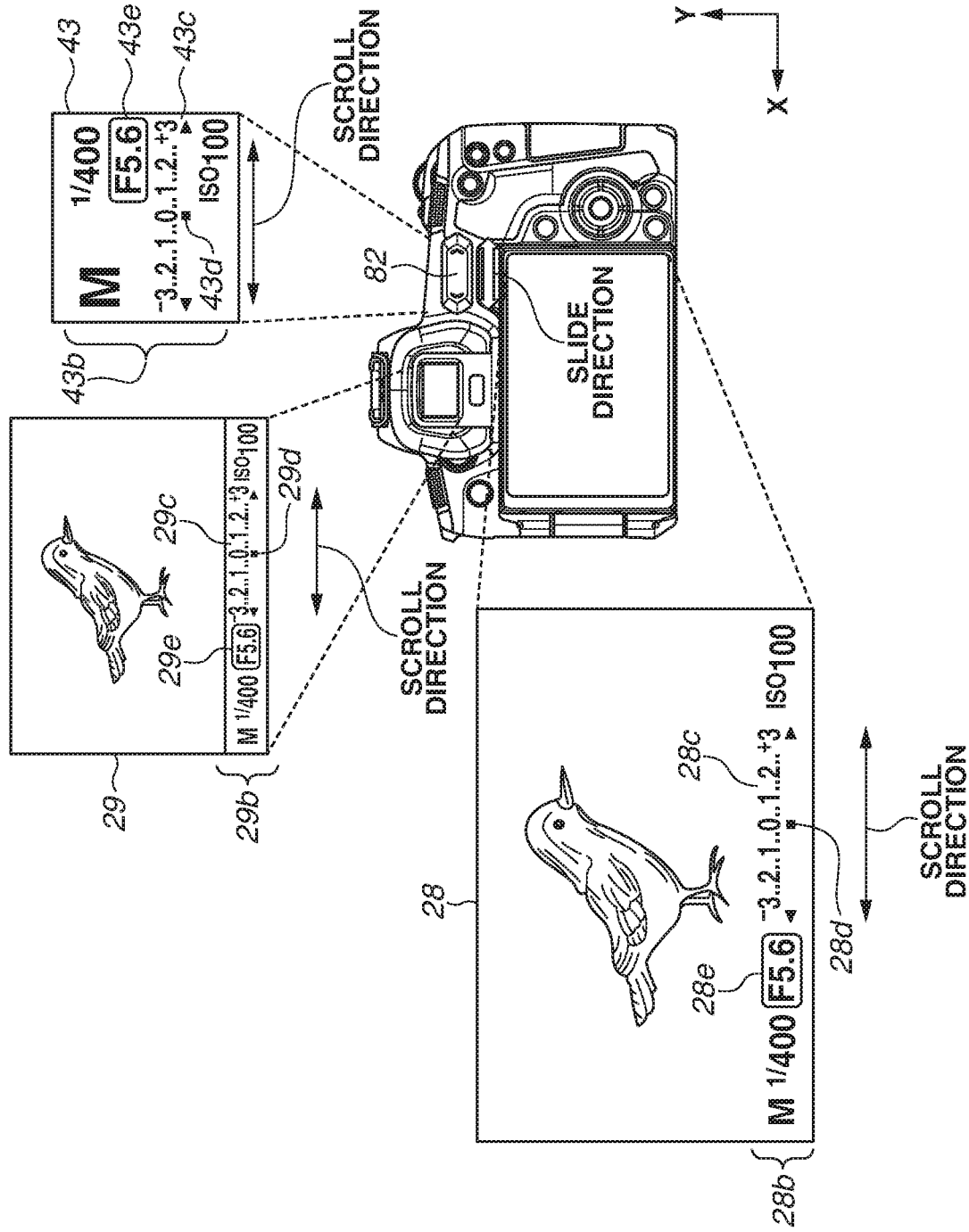

AREA OF RESISTIVE ELECTRODE

AREA OF LIGHT-RECEIVING UNIT

ELECTRONIC DEVICE

BACKGROUND OF THE INVENTION

Field of the Invention

The present invention relates to an electronic device, and in particular, to the placement configuration of an operation unit including a touch operation surface on which a touch operation is performed.

Description of the Related Art

Conventionally, in an imaging apparatus, operation members for selecting setting items, such as a directional pad and a dial, are provided.

In recent years, a product in which a touch panel is provided as a display device is widely prevalent. By merely touching a setting item displayed on the touch panel, a user can select and set the item.

Further, there is also a product in which a touch sensor is provided as an operation member. Thus, a touch sensor is also highly expected as a user interface in a case where a moving image is captured using an imaging apparatus.

If a setting is made using a conventional mechanical operation member while a moving image is captured, the operation sound is recorded as noise. An operation member using a touch sensor, however, can reduce the operation sound to be recorded.

Examples of the types of a touch panel and a touch sensor include a capacitive type, a resistive type, and an optical type. Each type has a strength and a weakness and is widely used according to use.

Among these types, the capacitive type can detect a touch with high accuracy and is employed in many devices.

The publication of Japanese Patent Application Laid-Open No. 2008-236765 discusses a technique for placing a touch operation member in an L shape in the periphery of a display screen on the back surface of an imaging apparatus. This resolves an issue of a finger staining a display screen by the finger directly touching the display screen when a touch panel is used.

Additionally, the publication of Japanese Patent Application Laid-Open No. 2008-236765 also discusses a technique for achieving downsizing and thinning of a device itself by reducing mechanical operation members, and for also improving the operability of the device.

Further, the publication of Japanese Patent Application Laid-Open No. 2012-10061 discusses a technique for placing a touch operation member in an upper surface portion of an imaging apparatus so that a user can operate a plurality of image capturing functions while gripping the operation member.

However, in the conventional technique discussed in the publication of Japanese Patent Application Laid-Open No. 2008-236765 and the publication of Japanese Patent Application Laid-Open No. 2012-10061, the user recognizes and operates various functions set for the touch operation member.

To this end, the touch operation member is placed on the assumption that the user operates the various functions while viewing the display screen placed on the back surface of the imaging apparatus.

Thus, if the placement of the touch operation member in the conventional art is employed in a high-performance imaging apparatus in which display devices are also placed in a viewfinder and an upper surface cover, there is an issue that it is difficult to operate the touch operation member while viewing the display of the viewfinder or the upper surface cover.

Particularly, when operating the touch operation member while looking into the viewfinder, the user touches the touch operation member without viewing the touch operation member. Thus, there is a possibility that the user performs an erroneous operation.

The present invention is directed to providing an electronic device in which a touch operation member that a user can operate while viewing at least two or more display monitors is provided.

The present invention is also directed to providing an electronic device in which a touch operation member that a user can operate by recognizing a touch detection unit even while looking into a viewfinder is provided.

SUMMARY OF THE INVENTION

According to an aspect of the present invention, an electronic device includes a first operation unit including a touch operation surface on which a touch operation and a slide operation are performed, a touch detection surface placed inside the touch operation surface and configured to detect the touch operation, and a gripping portion configured to be held by a user, wherein the touch detection surface is divided into at least two detection surfaces including a first detection surface to an N-th detection surface in order from a side distant from the gripping portion in a direction of the slide operation, wherein the gripping portion is provided the closest to the N-th detection surface among the at least two touch detection surfaces in the direction of the slide operation, wherein the touch operation surface includes a first operation surface, and a second operation surface provided on an outer edge of the first operation surface, wherein the first and second operation surfaces are different from each other in at least one of amount of protrusion, texture, and color, and wherein the first detection surface is provided over the second operation surface provided on the outer edge of the first operation surface on the side distant from the gripping portion.

Further features of the present invention will become apparent from the following description of exemplary embodiments with reference to the attached drawings.

BRIEF DESCRIPTION OF THE DRAWINGS

FIGS. 9A and 9B are schematic diagrams illustrating a slide direction on the touch bar and scroll directions on display units.

DESCRIPTION OF THE EMBODIMENTS (External View of Digital Camera 100)

Suitable exemplary embodiments of the present invention will be described below with reference to the drawings.

Figure 1A:
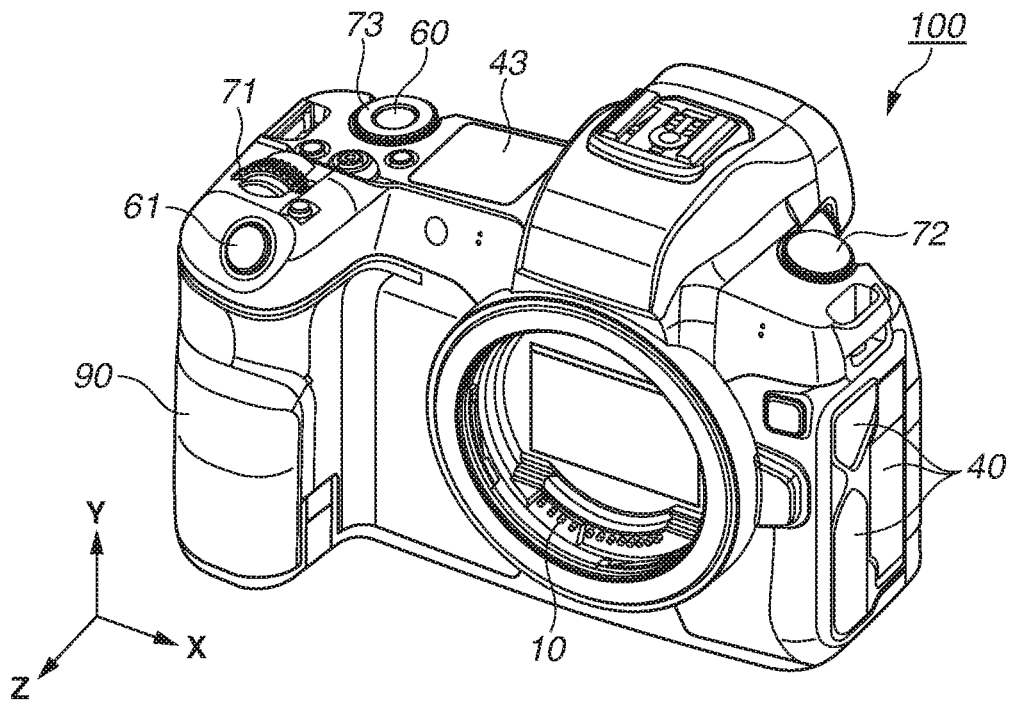
FIGS. 1A and 1B are external views of a digital camera.
Figure 1B:
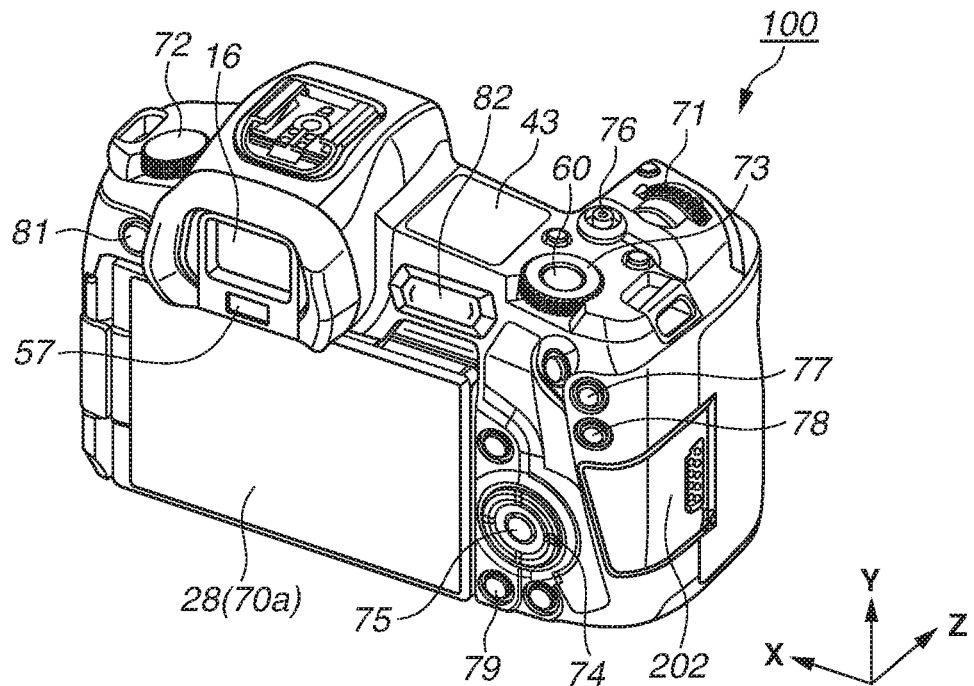

FIGS. 1A and 1B illustrate external views of a digital camera 100 as an example of an imaging apparatus to which the present invention is applicable.

FIG. 1A is a front perspective view of the digital camera 100, and FIG. 1B is a rear perspective view of the digital camera 100.

In FIGS. 1A and 1B, a display unit 28 is provided on the back surface of the camera 100 for displaying an image and various pieces of information. A touch panel 70a can detect a touch operation on a display surface (an operation surface) of the display unit 28.

An outside-viewfinder display unit 43 is provided on the upper surface of the camera 100 for displaying various setting values of the camera 100, such as those of the shutter speed and the stop.

A shutter button 61 is an operation unit for giving an image capturing instruction. A mode selection switch 60 is an operation unit for switching various modes.

A terminal cover 40 is a cover for protecting a connector (not illustrated) for a connection cable for connecting an external device and the digital camera 100.

A main electronic dial 71 is a rotary operation member included in an operation unit 70. By rotating the main electronic dial 71, it is possible to change the setting value of the shutter speed or the stop.

A power switch 72 is an operation member for switching the turning on and off of the digital camera 100.

A sub electronic dial 73 is a rotary operation member included in the operation unit 70 and enables the movement of a selection frame or image advancement.

A directional pad 74 is a directional pad (a four-direction key) which is included in the operation unit 70 and upper, lower, left, and right portions of which can be pushed in.

The directional pad 74 enables an operation according to a pushed portion thereof. A SET button 75 is a push button included in the operation unit 70 and is mainly used to determine a selection item.

A moving image button 76 is used to give an instruction to start or stop the capturing (recording) of a moving image. An automatic exposure (AE) lock button 77 is included in the operation unit 70. By pressing the AE lock button 77 in an image capturing standby state, it is possible to fix an exposure state.

An enlargement button 78 is an operation button included in the operation unit 70 and used to turn on and off an enlargement mode in live view (LV) display in an image capturing mode.

By turning on the enlargement mode and then operating the main electronic dial 71, it is possible to enlarge and reduce an LV image.

In a reproduction mode, the enlargement button 78 functions as an enlargement button for enlarging a reproduction image and increasing the enlargement ratio.

A reproduction button 79 is an operation button included in the operation unit 70 and used to switch the image capturing mode and the reproduction mode.

The reproduction button 79 is pressed in the image capturing mode, whereby the image capturing mode transitions to the reproduction mode, and the most recent image among images recorded in a recording medium 200 can be displayed on the display unit 28.

A menu button 81 is included in the operation unit 70. If the menu button 81 is pressed, a menu screen where various settings can be made is displayed on the display unit 28.

A user can intuitively make various settings using the menu screen displayed on the display unit 28, the directional pad 74, and the SET button 75.

A touch bar 82 is a line-shaped operation member (a line touch sensor) capable of receiving a touch operation.

The touch bar 82 is placed at the position where the touch bar 82 can be operated with the thumb of the right hand gripping a gripping portion 90 as a gripping portion.

The touch bar 82 can receive a tap operation thereon (the operation of touching the touch bar 82 with the thumb and separating the thumb from the touch bar 82 without moving the thumb within a predetermined period), and a slide operation to the left and right (the operation of touching the touch bar 82 with the thumb and then moving the touch position while keeping the contact with the touch bar 82).

The touch bar 82 is an operation member different from the touch panel 70a, and does not have a display function.

A communication terminal 10 is used by the digital camera 100 to communicate with a lens (attachable to and detachable from the digital camera 100).

An eyepiece portion 16 is an eyepiece portion of an eyepiece viewfinder (a look-in type viewfinder). The user can visually confirm a video displayed on an electronic viewfinder (EVF) 29 within the eyepiece viewfinder through the eyepiece portion 16.

An eye approach detection unit 57 is an eye approach detection sensor for detecting whether the eye of a photographer approaches the eyepiece portion 16.

A cover 202 is a cover of a slot in which the recording medium 200 is stored.

The gripping portion 90 is a gripping unit so shaped as to be easily gripped with the right hand when the user holds up the digital camera 100.

The shutter button 61 and the main electronic dial 71 are placed at the positions where the shutter button 61 and the main electronic dial 71 can be operated with the right index finger in the state where the digital camera 100 is held by gripping the gripping portion 90 with the right little, ring, and middle fingers.

Further, the sub electronic dial 73 and the touch bar 82 are placed at the positions where the sub electronic dial 73 and the touch bar 82 can be operated with the right thumb in the same state.

(Block Diagram Illustrating Example of Configuration of Digital Camera 100)

Figure 2:
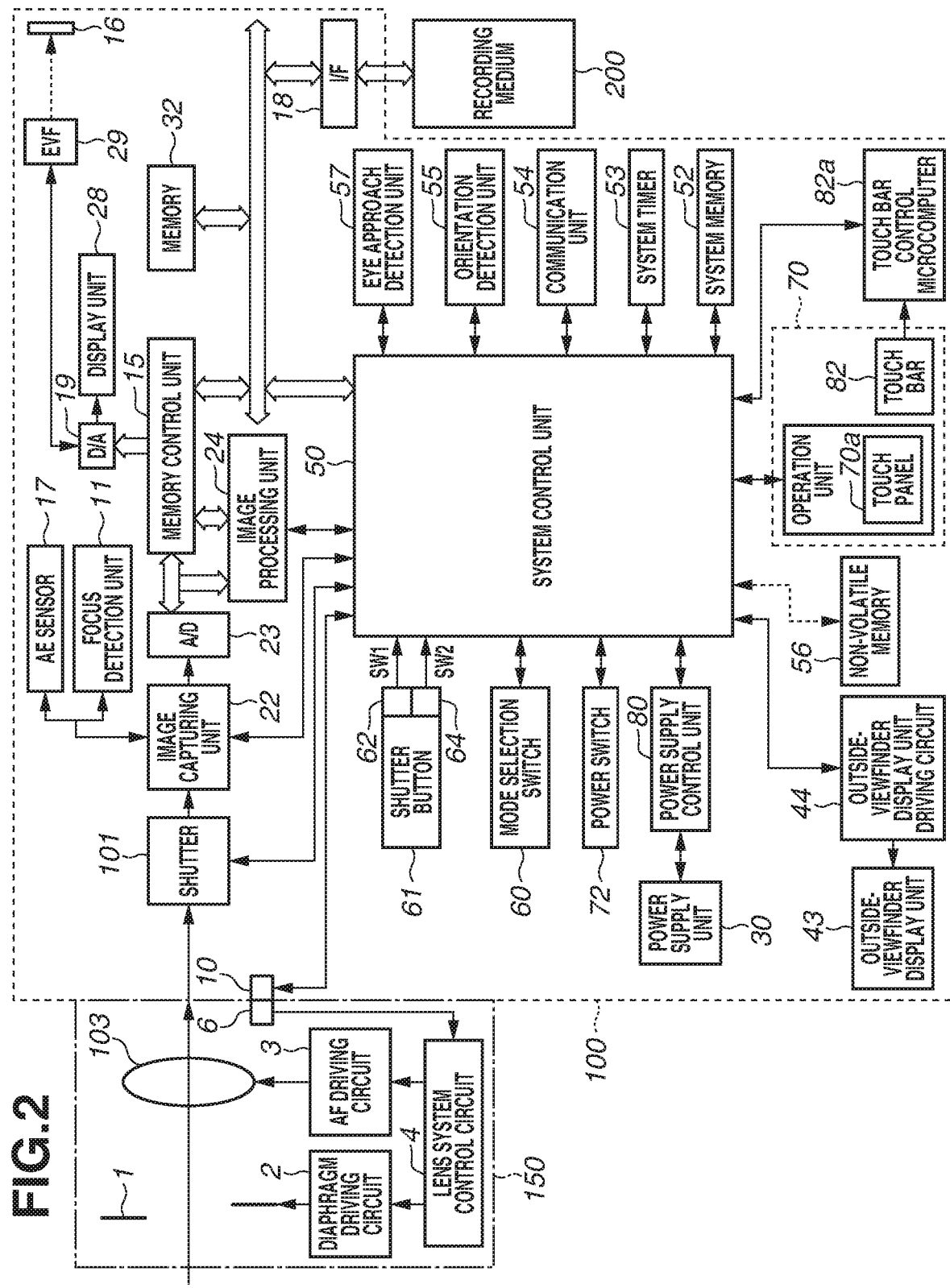
FIG. 2 is a schematic block diagram illustrating an example of a hardware configuration of the digital camera.

FIG. 2 is a block diagram illustrating an example of the configuration of the digital camera 100 according to the present exemplary embodiment.

In FIG. 2, an interchangeable imaging lens is provided in a lens unit 150.

Although a lens 103 normally includes a plurality of lenses, FIG. 2 illustrates only a single lens for simplification.

A communication terminal 6 is a communication terminal for the lens unit 150 to communicate with the digital camera 100. The communication terminal 10 is a communication terminal for the digital camera 100 to communicate with the lens unit 150.

The lens unit 150 communicates with a system control unit 50 via the communication terminals 6 and 10.

Then, a lens system control circuit 4 within the lens unit 150 controls a diaphragm 1 via a diaphragm driving circuit 2 and displaces the position of the lens 103 via an autofocus (AF) driving circuit 3, thereby bringing the lens 103 into focus.

An AE sensor 17 photometrically measures the luminance of an object through the lens unit 150.

A focus detection unit 11 outputs amount-of-defocus information to the system control unit 50.

Based on the amount of defocus information, the system control unit 50 controls the lens unit 150, thereby performing phase difference AF.

The focus detection unit 11 may be a dedicated phase difference sensor, or may be configured as an imaging plane phase difference sensor of an image capturing unit 22.

A shutter 101 is a focal-plane shutter capable of freely controlling the exposure time of the image capturing unit 22 by control of the system control unit 50.

The image capturing unit 22 is an image sensor formed by a charge-coupled device (CCD) or a complementary metal-oxide-semiconductor (CMOS) device, which converts an optical image into an electric signal.

An analog-to-digital (A/D) converter 23 converts an analog signal into a digital signal. The A/D converter 23 is used to convert an analog signal output from the image capturing unit 22 into a digital signal.

An image processing unit 24 performs a resizing process, such as predetermined pixel interpolation and reduction, and a color conversion process on data from the A/D converter 23 or data from a memory control unit 15.

Further, the image processing unit 24 performs a predetermined calculation process using captured image data. Then, the system control unit 50 performs exposure control and distance measurement control based on the calculation result obtained by the image processing unit 24.

Consequently, an AF process, an AE process, and a pre-flash (EF) process are performed by a through-the-lens (TTL) method.

Further, the image processing unit 24 performs a predetermined calculation process using captured image data and performs an auto white balance (AWB) process by the TTL method based on the obtained calculation result.

Output data from the A/D converter 23 is written directly to a memory 32 via the image processing unit 24 and the memory control unit 15 or via the memory control unit 15.

The memory 32 stores image data obtained by the image capturing unit 22 and converted into digital data by the A/D converter 23 and image data to be displayed on the display unit 28 or the EVF 29.

The memory 32 has a sufficient storage capacity for storing a predetermined number of still images and a moving image and a sound of a predetermined length of time.

Further, the memory 32 also serves as a memory for image display (a video memory).

A digital-to-analog (D/A) converter 19 converts data for image display stored in the memory 32 into an analog signal and supplies the analog signal to the display unit 28 or the EVF 29.

Image data for display thus written in the memory 32 is displayed on the display unit 28 or the EVF 29 via the D/A converter 19.

The display unit 28 or the EVF 29 performs display on a display device such as a liquid crystal display (LCD) or an organic electroluminescent (EL) display according to an analog signal from the D/A converter 19.

Analog signals are once converted into digital signals by the A/D converter 23, and the digital signals are accumulated in the memory 32 and converted into analog signals by the D/A converter 19.

Further, the analog signals are sequentially transferred to and displayed on the display unit 28 or the EVF 29, whereby the display unit 28 or the EVF 29 can perform LV display.

Hereinafter, an image displayed in live view will be referred to as a "live view image (LV image)".

The outside-viewfinder liquid crystal display unit 43 displays various setting values of the camera 100, such as those of the shutter speed and the stop, via an outside-viewfinder display unit driving circuit 44.

A non-volatile memory 56 is an electrically erasable and recordable memory. As the non-volatile memory 56, for example, an Electrically Erasable Programmable Read-Only Memory (EEPROM) is used.

The non-volatile memory 56 stores a constant for the operation of the system control unit 50 and a program.

The system control unit 50 is a control unit composed of at least one processor or circuit and controls the entirety of the digital camera 100.

The system control unit 50 executes the above program stored in the non-volatile memory 56, thereby achieving the processes described below in the present exemplary embodiment.

As a system memory 52, for example, a random-access memory (RAM) is used. A constant or a variable for the operation of the system control unit 50 and the program read from the non-volatile memory 56 are loaded into the system memory 52.

Further, the system control unit 50 controls the memory 32, the D/A converter 19, and the display unit 28, thereby also performing display control.

A system timer 53 is a time measurement unit for measuring the time used for various types of control or the time of a built-in clock.

The mode selection switch 60, a first shutter switch 62, a second shutter switch 64, and the operation unit 70 are operation units for inputting various operation instructions to the system control unit 50.

The mode selection switch 60 is used to switch the operation mode of the system control unit 50 to any one of a still image capturing mode, a moving image capturing mode, and the reproduction mode.

The still image capturing mode includes an auto image capturing mode, an auto scene distinction mode, a manual mode, a stop priority mode (an Av mode), a shutter speed priority mode (a Tv mode), and a program AE mode (a P mode).

Further, the still image capturing mode includes various scene modes in which image capturing settings are made according to image capturing scenes, and a custom mode. Using the mode selection switch 60, the user can directly switch to any one of these modes.

Alternatively, using the mode selection switch 60, the user may first switch to a list screen of image capturing modes, then select any one of a plurality of modes displayed on the list screen, and switch to the selected mode using another operation member. Similarly, the moving image capturing mode may also include a plurality of modes.

The first shutter switch 62 is turned on in an intermediate state of an operation, i.e., by a so-called half press (an image capturing preparation instruction), on the shutter button 61 provided in the digital camera 100 and generates a first shutter switch signal SW1.

Based on the first shutter switch signal SW1, an image capturing preparation operation such as an AF process, an AE process, an AWB process, or an EF process is started.

The second shutter switch 64 is turned on by the completion of an operation, i.e., by a so-called full press (an image capturing instruction), on the shutter button 61 and generates a second shutter switch signal SW2.

Based on the second shutter switch signal SW2, the system control unit 50 starts a series of operations of an image capturing process from the reading of a signal from the image capturing unit 22 to the writing of a captured image as an image file to the recording medium 200.

The operation unit 70 is various operation members serving as an input unit for receiving operations from the user. The operation unit 70 includes at least the following operation members.

Examples of the operation members include the shutter button 61, the main electronic dial 71, the power switch 72, the sub electronic dial 73, the directional pad 74, and the SET button 75.

Examples of the operation members further include the moving image button 76, the AF lock button 77, the enlargement button 78, the reproduction button 79, the menu button 81, and the touch bar 82.

A power supply control unit 80 includes a battery detection circuit, a direct-current-to-direct-current (DC/DC) converter, and a switch circuit for switching blocks to which to apply a current. The power supply control unit 80 detects the presence or absence of attachment of a battery, the type of a battery, and the remaining life of a battery.

Further, the power supply control unit 80 controls the DC/DC converter based on the detection results and an instruction from the system control unit 50 and supplies a required voltage to the components including the recording medium 200 for a required period.

A power supply unit 30 includes a primary battery such as an alkaline battery or a lithium battery, a secondary battery such as a nickel-cadmium (NiCd) battery, a nickel-metal hydrate (NiMH) battery, or a lithium-ion (Li) battery, or an alternating current (AC) adapter.

A recording medium interface (I/F) 18 is an interface with the recording medium 200 such as a memory card and a hard disk.

The recording medium 200 is a recording medium such as a memory card for recording a captured image and is formed by a semiconductor memory, an optical disc, or a magnetic disk.

A communication unit 54 connects to an external device wirelessly or via a cable for a wired connection, and transmits and receives a video signal and a sound signal to and from the external device.

The communication unit 54 can also connect to a wireless local area network (LAN) or the Internet.

Further, the communication unit 54 can communicate with the external device also using Bluetooth® or Bluetooth Low Energy.

The communication unit 54 can transmit an image (including an LV image) captured by the image capturing unit 22 or an image stored in the recording medium 200, or further receive an image or various other pieces of information from the external device.

An orientation detection unit 55 detects the orientation of the digital camera 100 relative to the direction of gravity.

Based on the orientation detected by the orientation detection unit 55, the system control unit 50 can determine whether an image captured by the image capturing unit 22 is an image captured with the digital camera 100 held up horizontally or an image captured with the camera 100 held up vertically.

The system control unit 50 can add direction information according to the orientation detected by the orientation detection unit 55 to an image file of an image captured by the image capturing unit 22 or store image data by rotating the image based on the orientation detected by the orientation detection unit 55.

As the orientation detection unit 55, an acceleration sensor or a gyro sensor can be used.

Using the acceleration sensor or the gyro sensor as the orientation detection unit 55, the system control unit 50 can also detect the motion of the digital camera 100 (whether the camera 100 is panned, tilted, lifted, or at rest).

<Description of Eyepiece Portion 16 of Viewfinder>

The eye approach detection unit 57 is an eye approach detection sensor for detecting (approach detection) the approach (eye approach) and the separation (eye separation) of an eye (a physical body) to and from the eyepiece portion 16 of the viewfinder.

According to a state detected by the eye approach detection unit 57, the system control unit 50 switches a display state and a non-display state of the display unit 28 and the EVF 29.

More specifically, in a case where the digital camera 100 is at least in an image capturing standby state and the display destination is switched by automatic switching, the display destination is set to the display unit 28, the display of the display unit 28 is turned on, and the EVF 29 is set to the non-display state while an eye does not approach.

Further, while an eye approaches, the display destination is set to the EVF 29, the display of the EVF 29 is turned on, and the display unit 28 is set to the non-display state.

As the eye approach detection unit 57, for example, an infrared proximity sensor can be used. The eye approach detection unit 57 can detect the approach of some kind of physical body to the eyepiece portion 16 of the viewfinder having the EVF 29 within.

If a physical body approaches, infrared light projected from a light projection unit (not illustrated) of the eye approach detection unit 57 is reflected by the physical body. Then, the reflected infrared light is received by a light-receiving unit (not illustrated) of the infrared proximity sensor.

It is also possible to determine at what distance from the eyepiece portion 16 the approaching physical body is (an eye approach distance) based on the amount of the received infrared light.

As described above, the eye approach detection unit 57 performs eye approach detection for detecting the distance from a physical body approaching the eyepiece portion 16.

In a non-eye approach state (a non-approach state), if a physical body approaching the eyepiece portion 16 within a predetermined distance from the eyepiece portion 16 is detected, it is detected that an eye has approached.

In an eye approach state (an approach state), if a physical body the approach of which has been detected separates from the eyepiece portion 16 by a predetermined distance or more, it is detected that an eye has separated.

A threshold for detecting eye approach and a threshold for detecting eye separation may be different from each other, for example, by providing hysteresis.

Further, after eye approach is detected, the eye approach state continues until eye separation is detected. After eye separation is detected, the non-eye approach state continues until eye approach is detected.

The infrared proximity sensor is merely an example, and another sensor may be employed as the eye approach detection unit 57 so long as the sensor can detect the approach of an eye or a physical body that can be regarded as eye approach.

(Description of Touch Panel 70a)

The touch panel 70a and the display unit 28 can be formed in an integrated manner.

For example, the touch panel 70a is configured so that the transmittance of light does not hinder the display of the display unit 28. Then, the touch panel 70a is attached to an upper layer of the display surface of the display unit 28.

Then, input coordinates on the touch panel 70a are associated with display coordinates on the display screen of the display unit 28.

Consequently, it is possible to provide a graphical user interface (GUI) as if the user can directly operate a screen displayed on the display unit 28.

The system control unit 50 can detect the following operations on the touch panel 70a or the following states.

The state where a finger or a pen that was not touching the touch panel 70a newly touches the touch panel 70a, i.e., the start of a touch (hereinafter referred to as a "touch-down").

The state where the finger or the pen touches the touch panel 70a (hereinafter referred to as a "touch-on").

The state of moving the finger or the pen while the finger or the pen keeps touching the touch panel 70a (hereinafter referred to as a "touch move").

The state of separating from the touch panel 70a the finger or the pen that was touching the touch panel 70a, i.e., the end of a touch (hereinafter referred to as a "touch-up").

The state where nothing touches the touch panel 70a (hereinafter referred to as a "touch-off").

If a touch-down is detected, simultaneously, a touch-on is detected.

After the touch-down, normally, the touch-on continues to be detected unless a touch-up is detected. A touch move is detected also in the state where the touch-on is detected.

Even when the touch-on is detected, if the touch position does not move, a touch move is not detected.

After a touch-up of all the fingers or the pen that was touching the touch panel 70a is detected, a touch-off is detected.

The system control unit 50 is notified via an internal bus of these operations and states and the position coordinates where the finger or the pen touches the touch panel 70a.

Then, based on the information of which the system control unit 50 is notified, the system control unit 50 determines what operation (touch operation) is performed on the touch panel 70a.

In the case of a touch move, the system control unit 50 can also determine, based on changes in the position coordinates, the moving direction of the finger or the pen moving on the touch panel 70a with respect to each of the vertical and horizontal components on the touch panel 70a.

If a touch move performed by a predetermined distance or more is detected, the system control unit 50 determines that a slide operation is performed.

The operation of quickly moving the finger by some distance while the finger keeps touching the touch panel 70a, and then separating the finger from the touch panel 70a immediately after the quick movement is referred to as a "flick".

In other words, the flick is the operation of quickly tracing the touch panel 70a with the finger in a flipping manner.

If a touch move performed by a predetermined distance or more at a predetermined speed or more is detected, and a touch-up is detected immediately after the touch move, the system control unit 50 can determine that a flick is performed (can determine that a flick is performed following a slide operation).

Further, a touch operation for simultaneously touching a plurality of places (e.g., two points) and bringing the touch positions close to each other is referred to as a "pinch-in", and a touch operation for separating the touch positions from each other is referred to as a "pinch-out".

A pinch-out and a pinch-in are collectively referred to as a "pinch operation" (or simply as a "pinch").

The touch panel 70a may be a touch panel of any of various types such as a resistive type, a capacitive type, a surface acoustic wave type, an infrared type, an electromagnetic induction type, an image recognition type, and a photosensor type.

Although a method for detecting the presence of a touch according to the presence of the contact of the finger or the pen with the touch panel 70a, or a method for detecting the presence of a touch according to the presence of the approach of the finger or the pen to the touch panel 70a is included depending on the type, either method can be used.

Further, based on output information regarding the touch bar 82, the system control unit 50 calculates the position coordinates of where a finger touches the touch bar 82.

Further, the system control unit 50 can detect the following operations on the touch bar 82 or the following states.

The state where a finger that was not touching the touch bar 82 newly touches the touch bar 82, i.e., the start of a touch (hereinafter referred to as a "touch-down").

The state where the finger touches the touch bar 82 (hereinafter referred to as a "touch-on").

The state of moving the finger while the finger keeps touching the touch bar 82 (hereinafter referred to as a "touch move").

The state of separating from the touch bar 82 the finger that was touching the touch bar 82, i.e., the end of a touch (hereinafter referred to as a "touch-up").

The state where nothing touches the touch bar 82 (hereinafter referred to as a "touch-off").

If a touch-down is detected, simultaneously, a touch-on is detected.

After the touch-down, normally, the touch-on continues to be detected unless a touch-up is detected.

A touch move is detected also in the state where the touch-on is detected.

Even when the touch-on is detected, if the touch position does not move, a touch move is not detected.

After a touch-up of the finger that was touching the touch bar 82 is detected, a touch-off is detected.

Based on these operations and states and the position coordinates, the system control unit 50 determines what operation (touch operation) is performed on the touch bar 82.

In the case of a touch move, a movement in a horizontal direction (a left-right direction) on the touch bar 82 is detected. If a movement made by a predetermined distance or more is detected, the system control unit 50 determines that a slide operation is performed.

If the operation of touching the touch bar 82 with the finger and separating the touch within a predetermined time without performing a slide operation, the system control unit 50 determines that a tap operation is performed.

In the present exemplary embodiment, the touch bar 82 is a touch sensor of a capacitive type.

Alternatively, a touch sensor of another type such as a resistive type, a surface acoustic wave type, an infrared type, an electromagnetic induction type, an image recognition type, or a photosensor type may be used.

(Resistive Type)

Figure 3:
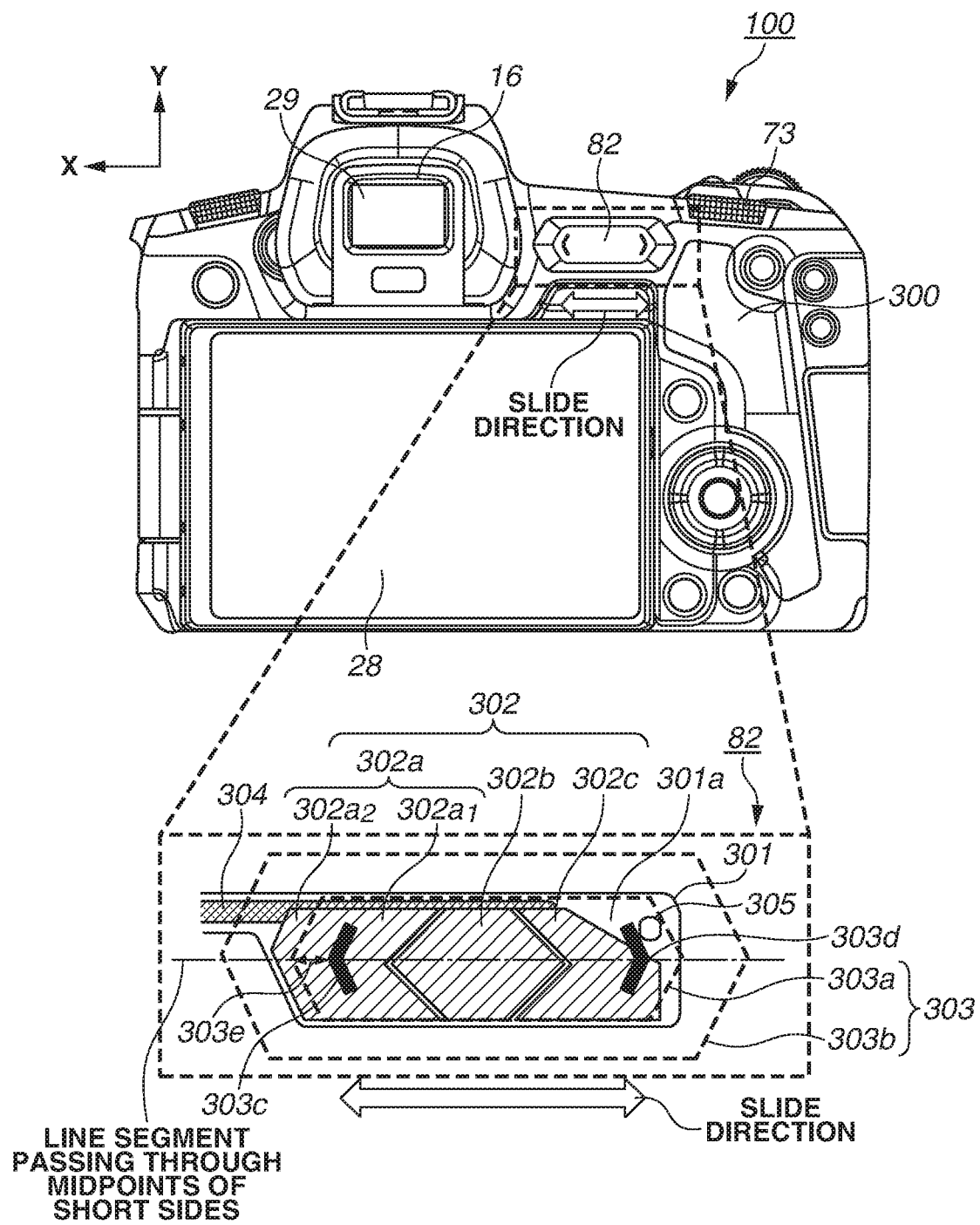
FIG. 3 is a diagram illustrating a rear view of the digital camera and a diagram illustrating an internal configuration of a touch bar.
Figure 16:
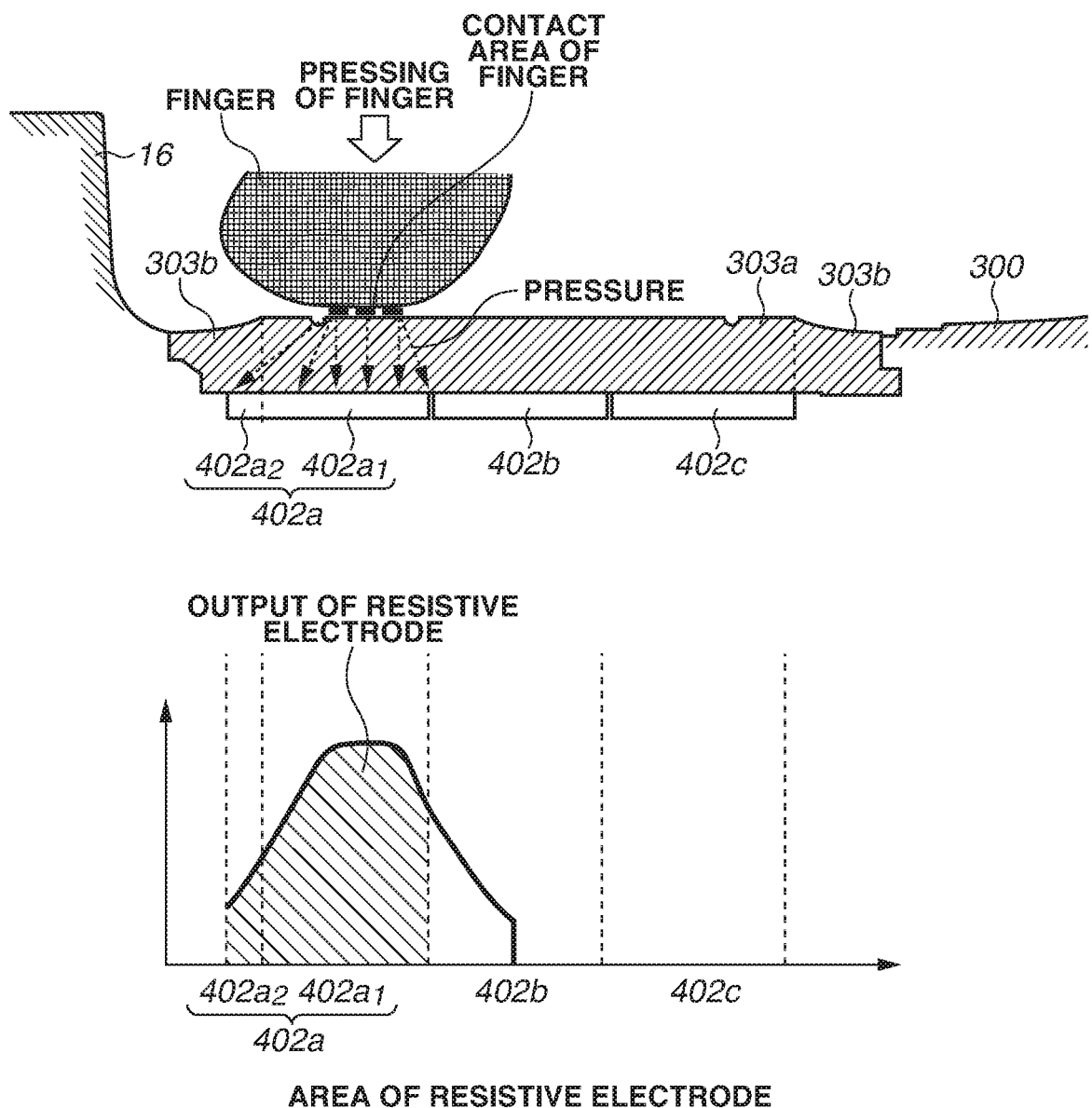
FIG. 16 is a schematic diagram illustrating touch detection of a resistive type applied to the present invention.

For example, FIG. 16 is a cross-sectional view of a key top 303 along a line segment passing through the centers of the short sides (in a Y-direction) of a touch sensor electrode 302 in FIG. 3 of a resistive type, and a graph illustrating the relationship between the cross-sectional view and touch sensor output from a resistive electrode 402.

A pressing force from the thumb of the user bends the key top 303 and changes the voltage of the touch sensor electrode 302 (the resistive electrode 402), whereby touch detection is performed.

As illustrated in FIG. 16, a resistive electrode 402*a* is distant from a gripping portion 300.

Thus, the thumb of the user slightly comes off the key top 303, and the pressing force of the thumb is likely to decrease. Thus, pressure on the resistive electrode 402*a* decreases.

To obtain stable detection even in the resistive electrode 402*a* distant from the gripping portion 300, a second touch detection region 402*a*$_2$ is provided, thereby enlarging the area of the electrode.

The second touch detection region 402*a*$_2$ is a region sticking out of a key top visible outline 303*a*, and the finger and the key top 303 are not in contact with each other in the second touch detection region 402*a*$_2$. The key top 303, however, bends into a circular arc with a contact portion between the thumb and the key top 303 at the center.

Thus, pressure is also transmitted to the second touch detection region 402*a*$_2$ portion. Thus, it is possible to increase the touch sensor output.

(Photosensor Type)

Figure 17:
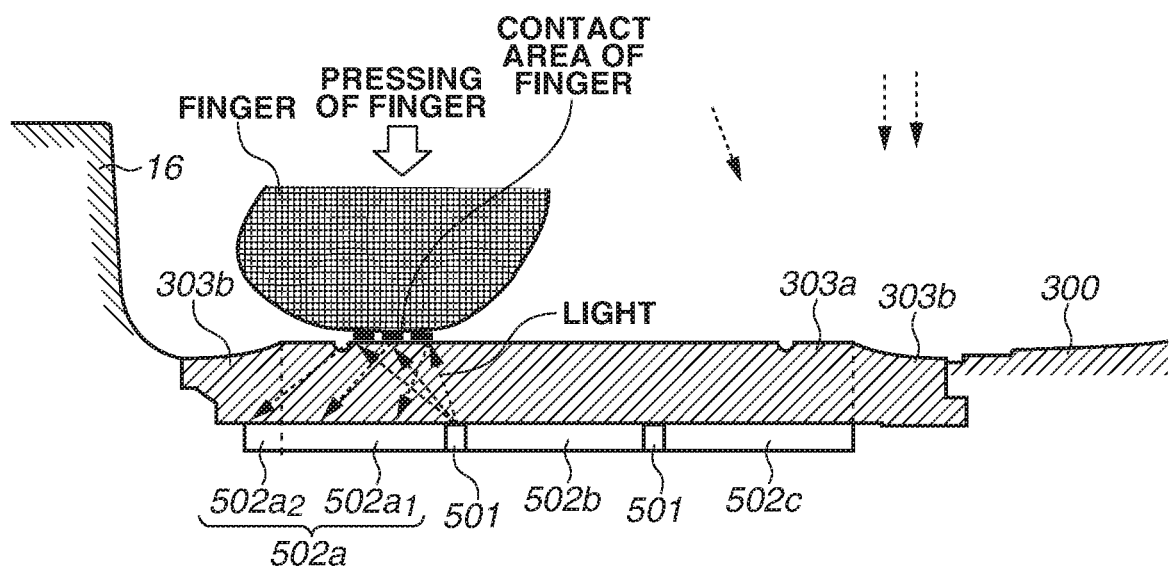
FIG. 17 is a schematic diagram illustrating touch detection of an optical type applied to the present invention.
Figure 17:
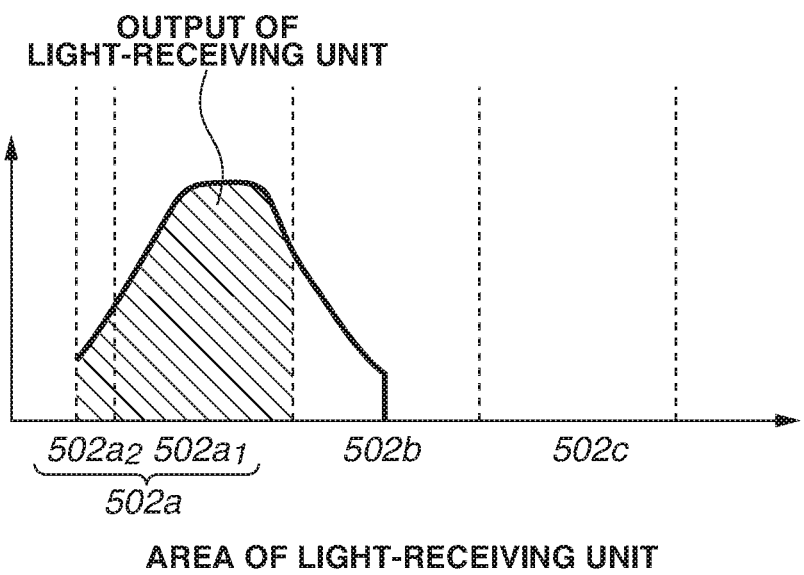

Further, FIG. 17 is a cross-sectional view of a key top 303 along a line segment passing through the centers of the short sides (in the Y-direction) of a touch sensor electrode 302 in FIG. 3 of a photosensor type (an optical type), and a graph illustrating the relationship between the cross-sectional view, a light-emitting unit 501, and touch sensor output from a light-receiving unit 502.

If the thumb of the user comes into contact with the key top 303, light emitted from the light-emitting unit 501 is reflected by the surface of the thumb, and the reflected light is received by the light-receiving unit 502, whereby touch detection is performed.

As illustrated in FIG. 17, a light-receiving unit 502*a* is distant from a gripping portion 300. Thus, the thumb of the user slightly comes off the key top 303, and the pressing force of the thumb is likely to decrease. As a result, the contact area of the thumb decreases, and the output of the light-receiving unit 502*a* decreases.

To obtain stable detection even in the light-receiving unit 502*a* distant from the gripping portion 300, a second touch detection region 502*a*$_2$ is provided, thereby enlarging the light-receiving area.

The second touch detection region 502*a*$_2$ is a region sticking out of a key top visible outline 303*a*, and the finger and the key top 303 are not in contact with each other in the second touch detection region 502*a*$_2$.

The light emitted from the light-emitting unit 501, however, is reflected by a contact portion between the key top 303 and the thumb and also reaches the second touch detection region 502*a*$_2$. Thus, it is possible to increase the touch sensor output.

As described above, in the present invention, not only a touch sensor of a capacitive type, but also a touch sensor of another type may be used.

(Operation Using Touch Bar 82)

Next, with reference to FIGS. 10A to 12, an operation using the touch bar 82 is described in detail.

Figure 10A:
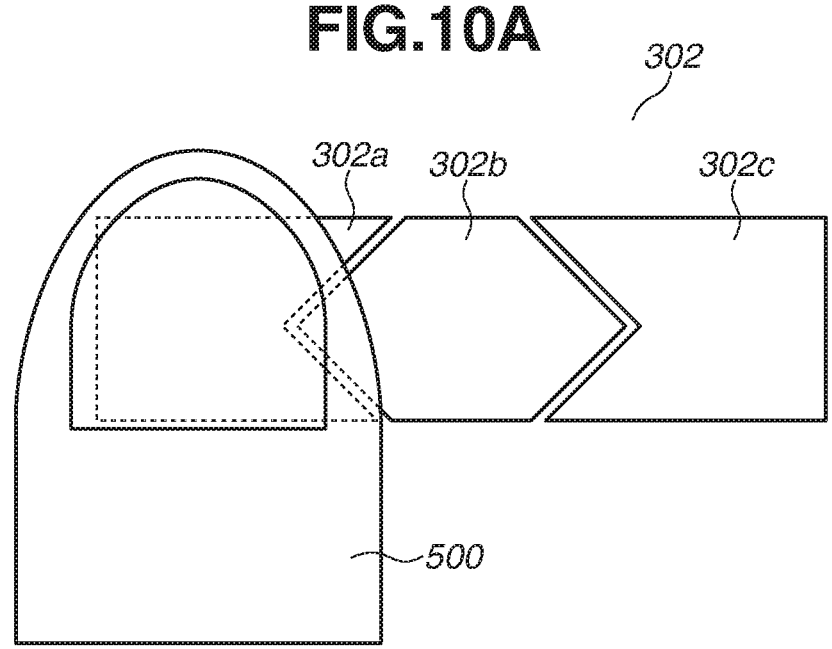
FIGS. 10A and 10B are conceptual diagrams of a tap operation.
Figure 10B:
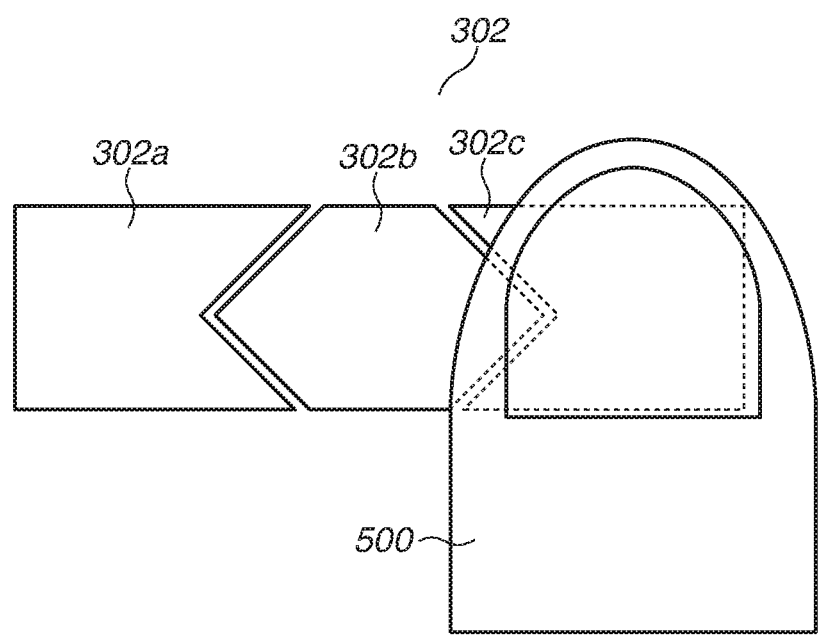
Figure 11A:
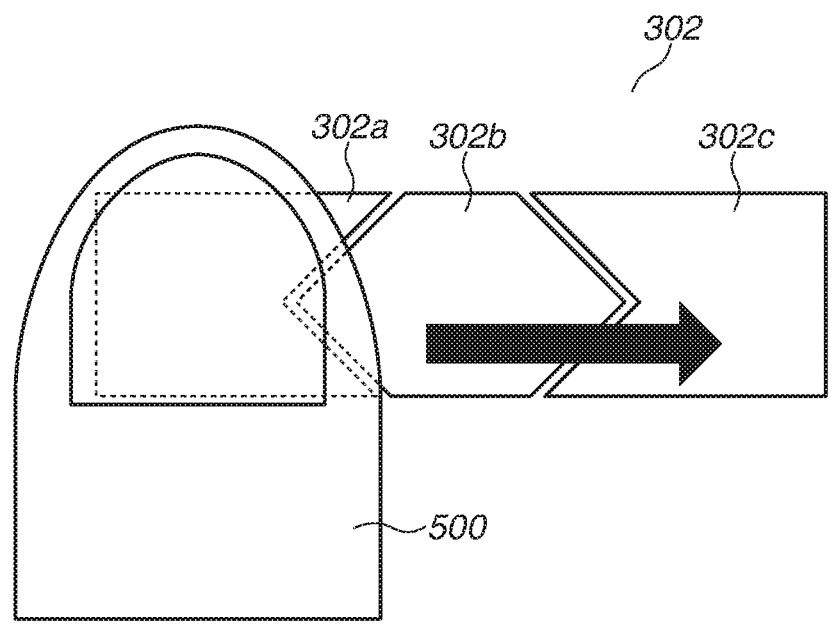
FIGS. 11A and 11B are conceptual diagrams of a slide operation.
Figure 11B:
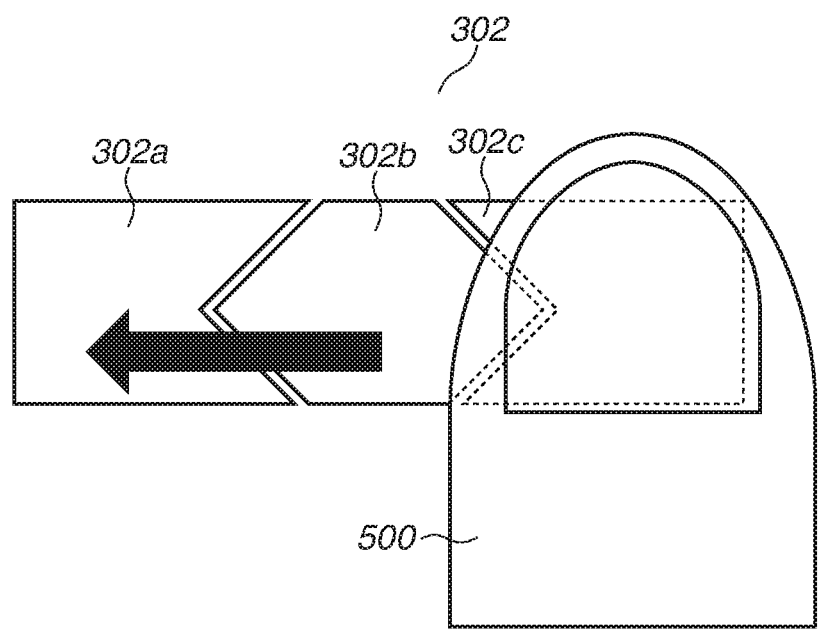
Figure 12:
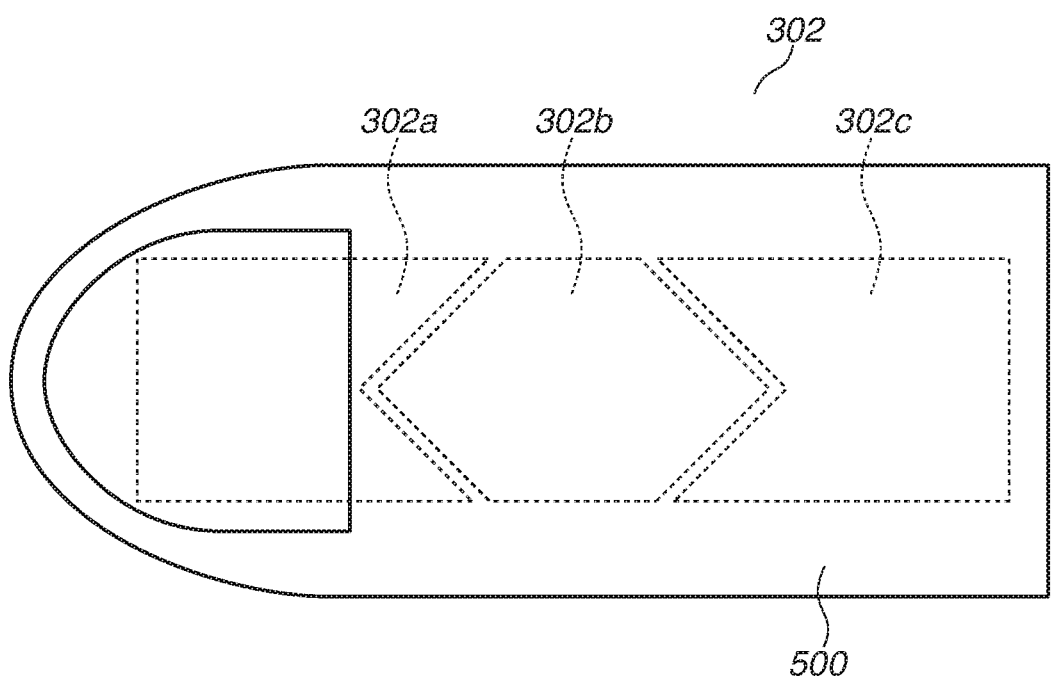
FIG. 12 is a conceptual diagram of an entire surface pressing operation.

FIGS. 10A and 10B are conceptual diagrams illustrating a tap operation. FIGS. 11A and 11B are conceptual diagrams illustrating a slide operation. FIG. 12 is a conceptual diagram illustrating an entire surface pressing operation.

All of FIGS. 10A to 12 omit the outlines of the touch bar 82 and a printed circuit board 301 and illustrate only an electrode 302 and an operating finger 500 with which the user performs an operation.

Further, the electrode 302 includes three electrodes, namely a first touch sensor electrode 302*a*, a second touch sensor electrode 302*b*, and a third touch sensor electrode 302*c* in order from the side closer to the eyepiece portion 16.

The electrode 302 detects a change in capacitance due to the operating finger 500 with which the user performs an operation, thereby enabling a tap operation, a slide operation, and an entire surface pressing operation.

Actually, the operating finger 500 of the user touches the touch bar 82 placed on the near side of the electrode 302, whereby touch detection is performed.

However, to simplify the description of the tap operation, the slide operation, and the entire surface pressing operation, the following description is given on the assumption that the operating finger 500 comes into contact with the electrode 302, whereby touch detection is performed.

(Tap Operation)

FIGS. 10A and 10B are conceptual diagrams illustrating the tap operation. FIG. 10A is a conceptual diagram illustrating a left tap operation. FIG. 10B is a conceptual diagram illustrating a right tap operation.

As illustrated in FIG. 10A, the operating finger 500 of the user comes into contact with the first touch sensor electrode 302*a* and separates from the first touch sensor electrode 302*a*, whereby this operation is detected as a left tap operation.

Further, similarly, as illustrated in FIG. 10B, the operating finger 500 of the user comes into contact with the third touch sensor electrode 302*c* and separates from the third touch sensor electrode 302*c*, whereby this operation is detected as a right tap operation.

In the present exemplary embodiment, two tap operations, namely the left tap operation and the right tap operation, are described. The present invention, however, is not limited to this. A center tap operation may be provided using the second touch sensor electrode 302*b*.

(Slide Operation)

FIGS. 11A and 11B are conceptual diagrams illustrating the slide operation. FIG. 11A is a conceptual diagram illustrating a right slide operation. FIG. 11B is a conceptual diagram illustrating a left slide operation.

As illustrated in FIG. 11A, in the electrode 302, the operating finger 500 comes into contact with the first touch sensor electrode 302a and then moves in the direction of the third touch sensor electrode 302c, whereby this operation is detected as a right slide operation.

Further, similarly, as illustrated in FIG. 11B, the operating finger 500 comes into contact with the third touch sensor electrode 302c and then moves to the first touch sensor electrode 302a, whereby this operation is detected as a left slide operation.

The start position of the slide operation is not limited to the first touch sensor electrode 302a or the third touch sensor electrode 302c. The slide operation may be started by coming into contact with the second touch sensor electrode 302b.

That is, the operation of bringing the operating finger 500 into contact with the second touch sensor electrode 302b and then moving the operating finger 500 in the direction of the third touch sensor electrode 302c may be detected as the right slide operation.

The operation of bringing the operating finger 500 of the user into contact with the second touch sensor electrode 302b and then moving the operating finger 500 in the direction of the first touch sensor electrode 302a may be detected as the left slide operation.

(Entire Surface Pressing Operation)

FIG. 12 is a conceptual diagram illustrating the entire surface pressing operation.

As illustrated in FIG. 12, if the entire electrode 302, i.e., all of the first touch sensor electrode 302a, the second touch sensor electrode 302b, and the third touch sensor electrode 302c, is touched at a time by the operating finger 500, this operation is detected as the entire surface pressing operation.

The operating finger 500 in the tap operation and the slide operation presses the electrode 302 substantially perpendicularly to the electrode 302, whereas the operating finger 500 in the entire surface pressing operation presses the electrode 302 substantially parallel to the electrode 302.

That is, the entire surface pressing operation can be said to be an operation which is more difficult to provide an input than the tap operation and the slide operation. The entire surface pressing operation is an operation that cannot be performed without the user consciously performing the operation.

The entire surface pressing operation does not necessarily need to be performed by touching the entire electrode 302 as illustrated in FIG. 12.

Even if a part of the first touch sensor electrode 302a and a part of the third touch sensor electrode 302c are not touched, this operation may be recognized as the entire surface pressing operation.

With reference to FIGS. 3 to 6B, the exemplary embodiment of the present invention will be described below.

<Description of Placement Position and Internal Configuration of Touch Bar 82>

FIG. 3 is a diagram illustrating the placement position and the internal configuration of the touch bar 82 of the digital camera 100 as an imaging apparatus (an electronic device) according to the present exemplary embodiment.

As illustrated in FIG. 3, the touch bar 82 is placed adjacent to the eyepiece portion 16 on the back surface side of the digital camera 100.

Further, the touch bar 82 is placed also adjacent to the sub electronic dial 73 and a thumb standby position 300, which is the position of the thumb when the camera 100 is held by gripping the grip 90 with the right hand.

FIG. 3 illustrates an enlarged view of the internal configuration of the touch bar 82. The touch bar 82 includes a touch sensor electrode 302 as a detection unit for detecting a touch operation. The touch sensor electrode 302 enables a tap operation and a slide operation to the left and right (a slide direction illustrated in FIG. 3).

(A touch detection surface of) the touch sensor electrode 302 is placed by dividing the touch sensor electrode 302 into three portions, namely touch sensor electrodes 302a, 302b, and 302c from the eyepiece portion 16 side.

In the present exemplary embodiment, the description is given on the assumption that the number of divisions of (the touch detection surface of) the touch sensor electrode 302 is three. The number of divisions, however, is not limited to three, and may be two or four or more.

In the enlarged view in FIG. 3, dotted lines indicate the visible outlines of a key top 303 as an external appearance component of the touch bar 82.

Further, a dashed-dotted line indicates a line segment passing through the centers of the short sides (in the Y-direction) of the touch sensor electrode 302.

A region contained in a key top visible outline 303a is a first operation surface that overlaps the touch sensor electrode 302 and is recognized by the user as a region where touch detection can be performed.

Then, a region between the key top visible outline 303a and a key top visible outline 303b does not overlap the touch sensor electrode 302.

Thus, this region is a second operation surface that is recognized by the user as a non-detection region where touch detection is not performed.

At the left and right ends (ends in an X-direction) of the first operation surface contained in the key top visible outline 303a, dogleg-shaped (arrow-shaped) indicators 303c and 303d are provided.

The indicators 303c and 303d indicate the slide direction on the touch bar 82 so that the user can know the slide direction on the touch bar 82.

Further, the indicators 303c and 303d have protruding or recessed shapes so that when the user slides the thumb in contact with the touch bar 82, the user can know each of the left and right ends by feel.

In the present exemplary embodiment, a description will be given below of the reason for providing in the key top 303 the non-detection region where touch detection is not performed.

Each touch sensor electrode is composed of copper foil on a printed circuit board 301 and connected to the system control unit 50 by a copper foil wire 304 on the printed circuit board 301.

As described above, based on output information regarding the touch bar 82, i.e., information input from the touch sensor electrodes 302a, 302b, and 302c, the system control unit 50 calculates position coordinates.

Based on an operation or a state, the system control unit 50 determines what operation is performed on the touch bar 82.

The area of the touch sensor electrode 302a is relatively greater than that of the touch sensor electrode 302c so that it is easy to provide an input to the touch sensor electrode 302a.

In the present exemplary embodiment, the area of the touch sensor electrode 302a is approximately 36 mm$^2$, the area of the touch sensor electrode 302b is approximately 34 mm², and the area of the touch sensor electrode 302c is approximately 26 mm².

The area of the touch sensor electrode 302a is set to 1.3 to 1.4 times that of the touch sensor electrode 302c.

Further, the relative size relationships among the touch sensor electrodes 302a, 302b, and 302c are set such that 302a>302b>302c.

Further, the touch sensor electrode 302a is so shaped as to stick out further to the eyepiece portion 16 side than the first operation surface indicated by the key top visible outline 303a.

A region of the touch sensor electrode 302a contained in the key top visible outline 303a is a first touch detection region $302a_1$, and a region of the touch sensor electrode 302a sticking out of the key top visible outline 303a is a second touch detection region $302a_2$.

Further, in the second operation surface between the key top visible outlines 303a and 303b, a region that does not overlap the second touch detection region $302a_2$ is a second touch non-detection region. The reason is as follows.

The touch sensor electrode 302a is distant from the thumb standby position 300.

Thus, the thumb of the user is likely to slightly come off the touch sensor electrode 302a. To obtain stable detection without a sufficient touch area, the second touch detection region $302a_2$ is provided, thereby enlarging the area of the electrode.

If, however, the second touch detection region 302a2 sticks out excessively, then also in a case where the user touches the second operation surface of the key top 303, a touch is erroneously detected.

Thus, the amount of the touch sensor electrode 302a sticking out is not greater than a length 303e between the left end of the first operation surface of the key top 303 and the indicator 303c.

Consequently, the touch sensor electrode 302a can eliminate the difficulty of providing an input due to the distance from the thumb standby position 300 and the closeness to the eyepiece portion 16, thereby improving the adjustment to the desired ease of providing an input.

By this adjustment, it is possible to accurately calculate position coordinates and accurately determine an operation according to the intention of an operation of the user.

(Relationship between Contact Area of Thumb and Touch Detection Amount)

Next, with reference to FIGS. 13A and 13B, the relationships among the key top 303, the touch sensor electrode 302, and the touch detection amount will be described.

Figure 13A:
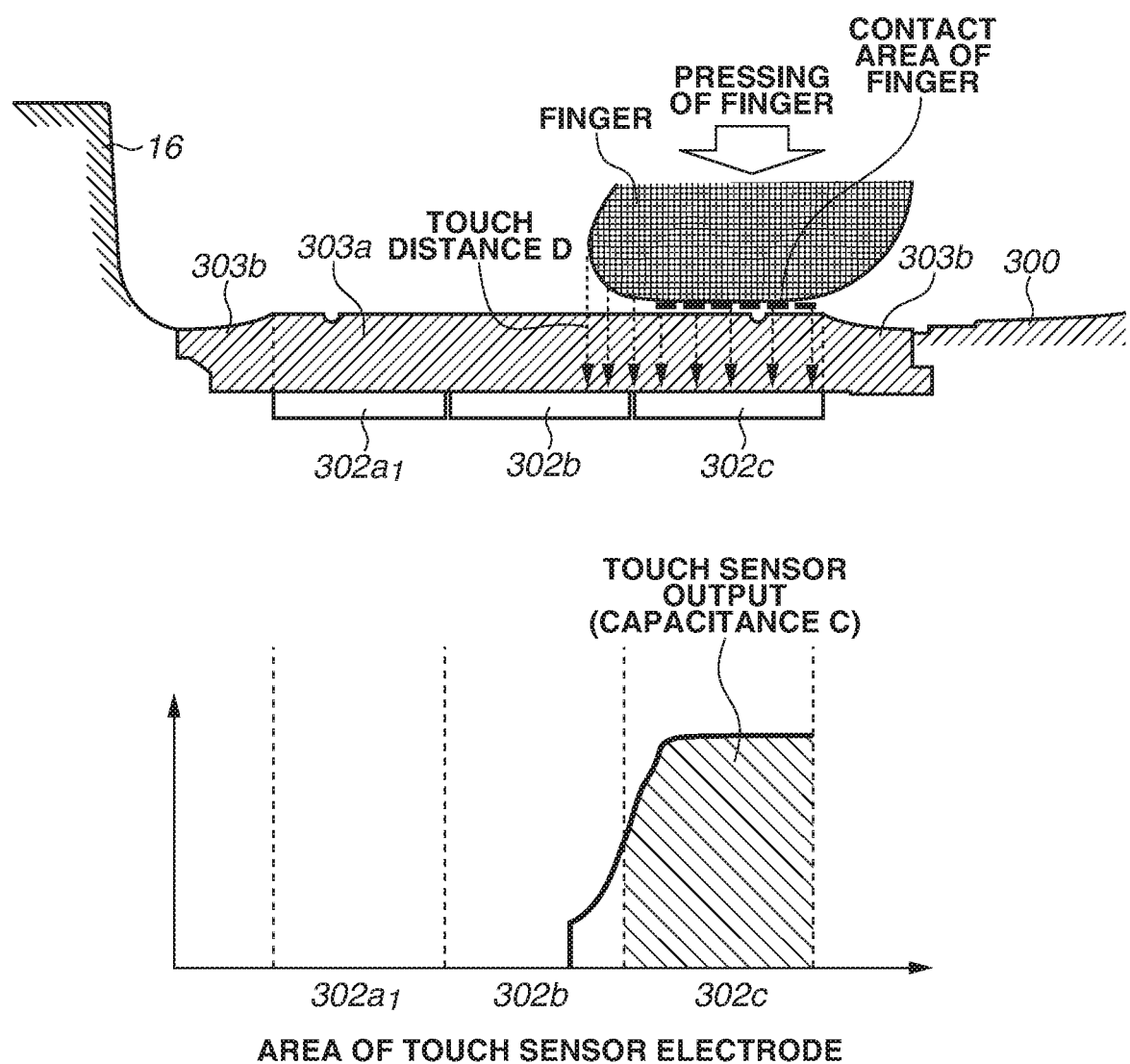
FIGS. 13A and 13B are schematic diagrams illustrating a contact area of a finger according to an embodiment.
Figure 13B:
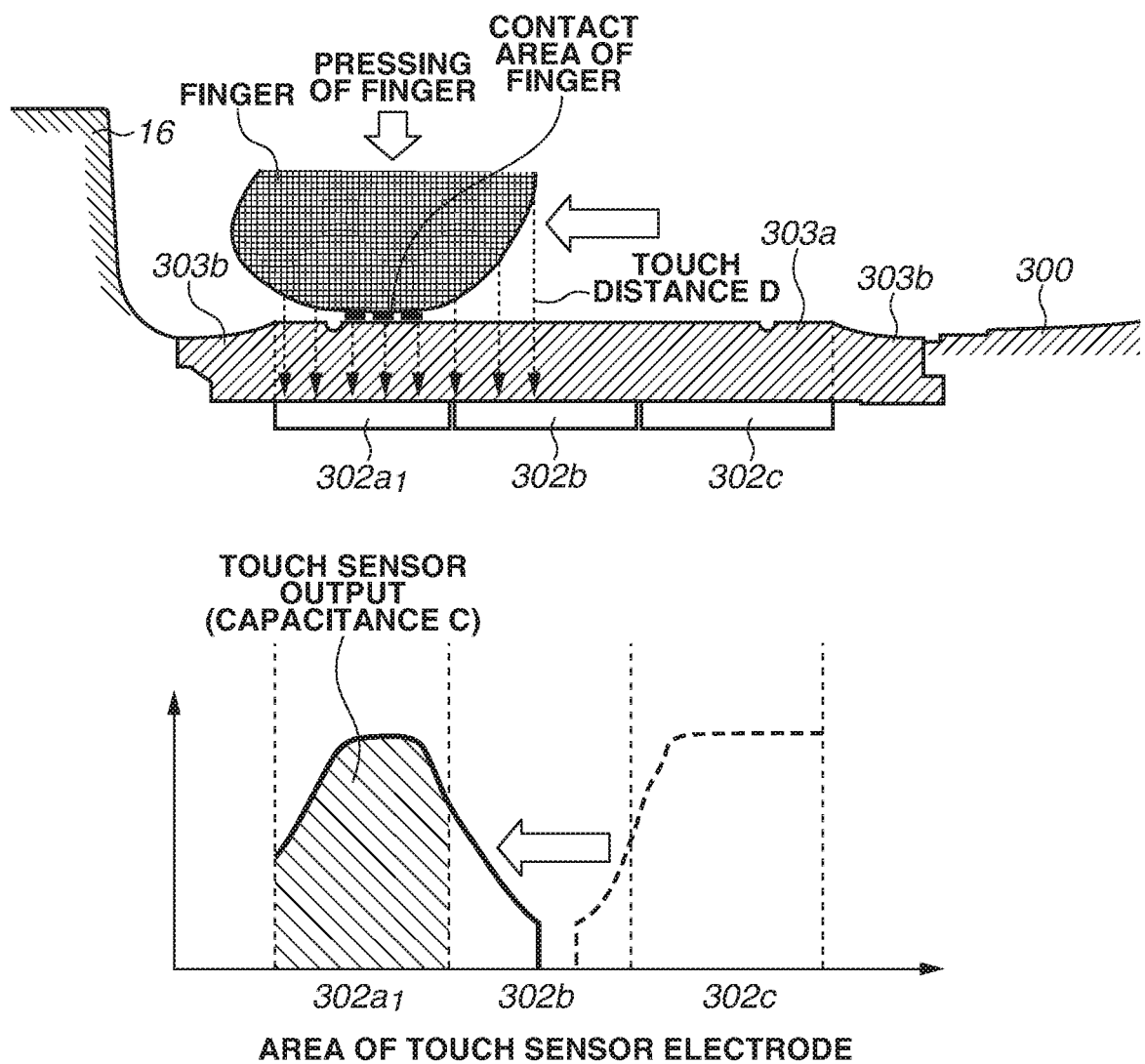

FIGS. 13A and 13B are a cross-sectional view of the key top 303 along the line segment passing through the centers of the short sides (in the Y-direction) of the touch sensor electrode 302 in FIG. 3, and a graph illustrating the relationship between the cross-sectional view and touch sensor output from the touch sensor electrode 302.

FIG. 13A illustrates the state where the user brings the thumb into contact with the key top 303 on the touch sensor electrode 302c close to the gripping portion 300 while gripping the gripping portion 90 of the digital camera 100.

At this time, capacitance C between a contact portion of the thumb and the touch sensor electrode 302 is great, and the amount of change in the capacitance C is detected as the touch sensor output.

The graph in FIG. 13A illustrates the capacitance C corresponding to the electrodes 302a, 302b, and 302c of the touch sensor electrode 302, and the touch sensor output of the touch sensor electrode 302c corresponds to the area of a shaded portion in the graph.

Generally, the capacitance C is obtained by the following formula based on an area S in which the finger of the user and the touch sensor electrode 302 are opposed to each other, and a touch distance D. The greater the area S in which the finger of the user and the touch sensor electrode 302 are opposed to each other and the shorter the touch distance D, the greater the capacitance C.

$$C=\varepsilon \times S/D[F]$$

Further, ε is permittivity. Generally, the relative permittivity of air is approximately 1. Since the material of the key top 303 is a resin material, the key top 303 has a relative permittivity approximately three times that of air.

Thus, in the contact portion between the thumb and the key top 303, the capacitance C is detected based on a relative permittivity approximately three times that of air and the shortest touch distance D.

As illustrated in FIG. 13A, the user presses a portion of the key top 303 close to the gripping portion 300 and therefore can strongly press the thumb against the key top 303. Thus, the contact area between the thumb and the key top 303 is great, and the touch sensor output is great.

Thus, the touch sensor electrode 302c does not need to stick out further to the gripping portion 300 side than the first operation surface indicated by the key top visible outline 303a. If the touch sensor electrode 302c sticks out greatly, and when the user presses the touch sensor electrode 302c while gripping the gripping portion 300, the touch sensor electrode 302c may make erroneous detection.

Further, the capacitance C is detected even in a region where the thumb and the key top 303 are not in contact with each other as long as the touch sensor electrode 302 and the finger are opposed to each other. In this case, however, the touch distance D is long via air, and therefore, the touch sensor output decreases as compared with a contacted portion.

Next, FIG. 13B illustrates the state where the user brings the thumb into contact with the key top 303 on the touch sensor electrode 302a close to the eyepiece portion 16 while gripping the gripping portion 90 of the digital camera 100.

If the user moves the thumb from the touch sensor electrode 302c close to the gripping portion 300 to the touch sensor electrode 302a close to the eyepiece portion 16, the capacitance C detected by the touch sensor electrode 302c decreases.

Then, the capacitance C detected by the touch sensor electrode 302a increases.

When the user moves the thumb to the touch sensor electrode 302a, and if the user slides the thumb in contact with the key top 303, the touch detection amount also slides as illustrated in the graph in FIG. 13B.

The touch sensor output corresponds to the area of the graph. Thus, if the user slides the thumb in contact with the key top 303 as illustrated in the graph in FIG. 13B, the touch sensor output increases or decreases in the order of the electrodes 302c, 302b, and 302a.

At this time, according to the ratio between the touch sensor outputs of the electrodes 302c, 302b, and 302a, it is possible to linearly detect the slide position of the thumb.

As illustrated in FIG. 13B, the touch sensor electrode 302a is distant from the gripping portion 300. Thus, the thumb of the user slightly comes off the key top 303, and the pressing force of the thumb is likely to decrease. Thus, the contact area between the thumb and the key top 303 is likely to be small.

Thus, as illustrated in the graph in FIG. 13B, in a contactless portion, the touch distance D is long via air. Thus, the touch sensor output of the touch sensor electrode 302a is likely to be small.

If the touch sensor output is small, the responsiveness or the linearity of a touch operation may deteriorate.

Thus, in the present invention, as described above, to obtain stable detection even in the touch sensor electrode 302a distant from the gripping portion 300, the second touch detection region $302a_2$ is provided, thereby enlarging the area of the electrode.

Figure 14:
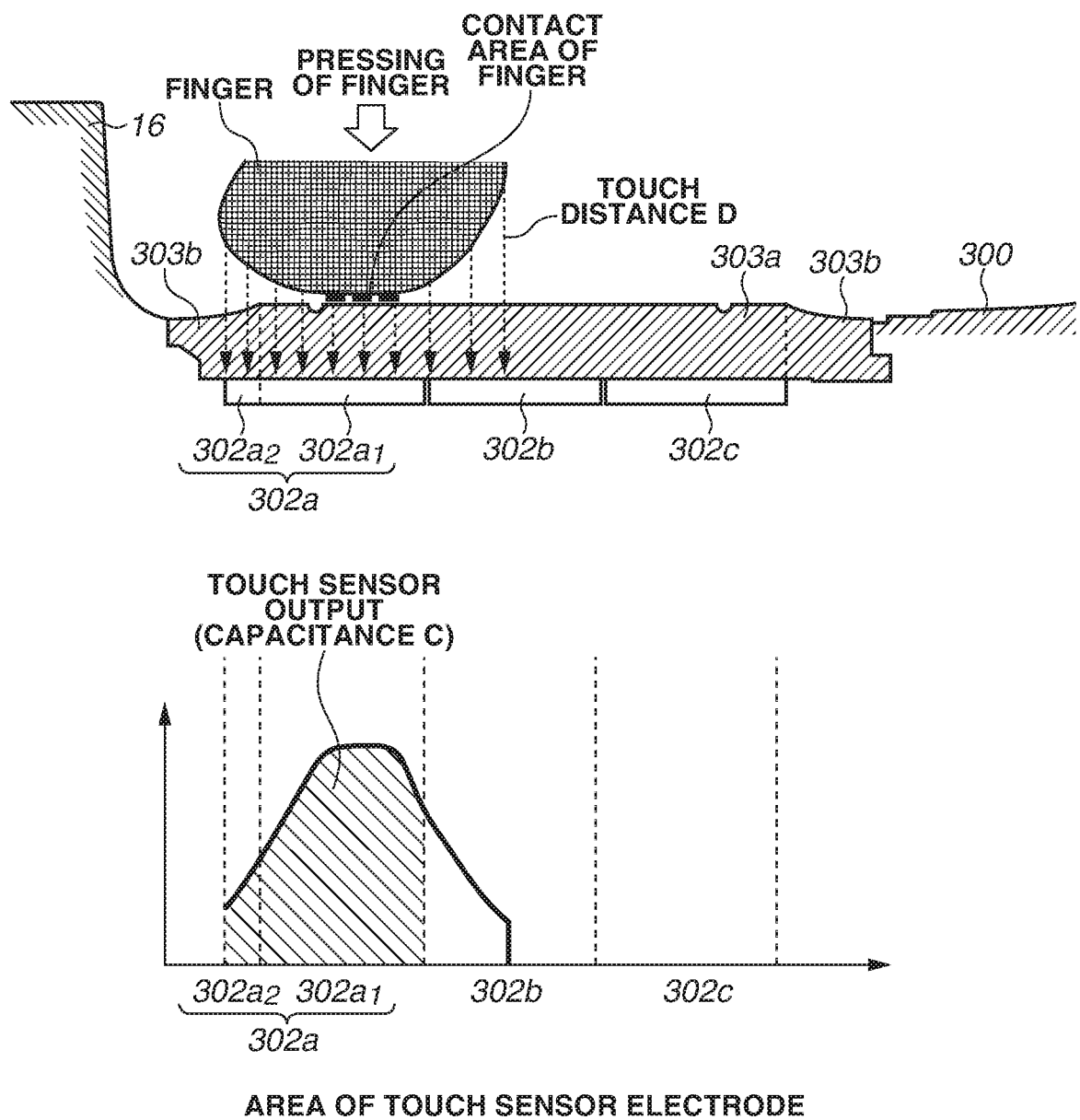
FIG. 14 is a schematic diagram illustrating a relationship between a contact area of a finger and a touch detection amount according to an embodiment.

FIG. 14 is a cross-sectional view of the key top 303, and a graph illustrating the relationship between the cross-sectional view and touch sensor output from the touch sensor electrode 302 according to the present invention.

The touch detection region $302a_2$ is a region sticking out of the key top visible outline 303a, and the finger and the key top 303 are not in contact with each other in the touch detection region $302a_2$.

However, as described above, the capacitance C is detected via air in a region where the touch sensor electrode 302 and the finger are opposed to each other.

If the center of the thumb is located immediately above the touch sensor electrode 302a as illustrated in FIG. 10, the thumb and the touch sensor electrode 302a have a relationship where the thumb sticks out of the touch sensor electrode 302a. Thus, the thumb contains the touch detection region $302a_2$.

The touch sensor output of the touch detection region 302a2 is obtained via air and therefore is approximately a third or less as illustrated in the graph in FIG. 14.

It is, however, possible to compensate for the decrease in the touch sensor output as a result of the contact area being small due to the fact that the thumb of the user slightly comes off the key top 303.

Further, the touch sensor electrode 302c is so shaped that a portion of the touch sensor electrode 302c close to the sub electronic dial 73 is cut.

More specifically, the touch sensor electrode 302c is cut in a slope shape such that the closer the touch sensor electrode 302c is to the sub electronic dial 73 in the X-axis direction, the larger the cut region.

Thus, the area of the touch sensor electrode 302 is smaller than that of the first operation surface indicated by the key top visible outline 303a, and the cut region is a first touch non-detection region 301a.

However, if the touch sensor electrode 302c is excessively smaller than the first operation surface, there is a case where touch detection is not performed even if the user touches the first operation surface recognized by the user as the region where touch detection can be performed.

Thus, half or more of the touch sensor electrode 302c overlaps the indicator 303d of a touch detection region of the key top 303.

Consequently, even if a vigorous operation is performed on the sub electronic dial 73, an unintended input is less likely to be provided to the touch sensor electrode 302c.

Further, in the printed circuit board 301, a positioning hole 305 is provided in empty space created by making the touch sensor electrode 302c small.

The imaging apparatus (electronic device) 100 includes the first display unit 29 on its surface on the back surface side where the touch operation surface 303 of the first operation unit 82 is placed.

The imaging apparatus (electronic device) 100 includes the second display units 28 and 43 provided in a direction orthogonal to the direction of the slide operation on the touch detection surface 302 with respect to the touch operation surface 303 of the first operation unit 82.

The touch operation surface 303 is non-conductive.

The touch detection surface 302 is placed inside the touch operation surface 303.

The imaging apparatus (electronic device) 100 includes conductive covers 404 and 406 placed to cover the periphery of the touch operation surface 303.

The touch detection surface 302 is divided into at least two detection surfaces including the first touch detection surface 302a to an N-th touch detection surface 302n in order from the first display unit 29 side in the direction of the slide operation.

The gripping portion 90 to be held by the user is the closest to the N-th touch detection surface 302n among the at least two touch detection surfaces in the direction of the slide operation. N is a natural number.

In FIG. 3, N=3. The gripping portion 90 is the closest to the third touch detection surface 302c in the direction of the slide operation.

The second display unit 28 is provided on the surface of the digital camera 100 on the back surface side where the touch operation surface 303 is placed.

FIG. 3 illustrates the imaging apparatus 100 as viewed from the back surface side of the imaging apparatus 100.

The second display unit 28 is placed such that the scroll direction of a setting item that is displayed on the second display unit 28 and operable using the first operation unit 82 and the direction of the slide operation on the touch operation surface 303 coincide with each other.

The second display unit 43 is placed on the upper surface of the electronic device 100, which is different from the surface of the electronic device 100 on the back surface side where the touch operation surface 303 is placed.

The second display unit 43 is placed such that the scroll direction of a setting item that is displayed on the second display unit 43 and operable using the first operation unit 82, and the direction of the slide operation on the touch operation surface 303 coincide with each other.

The second display unit 28 is a touch panel.

When viewed from the back surface side of the electronic device 100, the second display unit 28 is placed such that the direction of the slide operation on a touch panel surface of the second display unit 28 and the direction of the slide operation on the touch operation surface 303 coincide with each other.

At the closest position to the N-th touch detection surface 302n among the at least two touch detection surfaces in the direction of the slide operation on the touch operation surface 303, the rotary operation member 73 is provided (see FIG. 3).

In FIG. 3, since N=3, the rotary operation member (sub electronic dial) 73 is provided at the closest position to the third touch detection surface 302c.

When viewed from the back surface side of the electronic device 100, the rotary operation member (sub electronic dial) 73 is placed such that the rotational direction of the rotary operation member 73 and the direction of the slide operation on the touch operation surface 303 coincide with each other.

When viewed from the back surface side of the electronic device 100, the first operation unit 82 is placed on the trajectory of the finger of the user performing a rotational operation on the rotary operation member 73.

The first display unit 29 is the eyepiece portion 16 placed adjacent to the touch operation surface 303 in the direction of the slide operation and protruding to the back surface side with respect to the touch operation surface 303 of the first operation unit 82.

When viewed from the back surface side of the electronic device 100, the eyepiece portion 16 is placed such that the scroll direction of a setting item that is displayed on the eyepiece portion 16 and operable using the first operation unit 82, and the direction of the slide operation on the touch operation surface 303 coincide with each other.

The touch detection surface 302 is distant from the covers 404 and 406 such that the touch detection surface 302 is electrically insulated from the covers 404 and 406.

The touch operation surface 303 includes the first operation surface 303a that overlaps the touch detection surface 302, and the second operation surface 303b that is placed in the outer periphery of the first operation surface 303a and does not overlap the touch detection surface 302.

The first operation surface 303a and the second operation surface 303b are different from each other in any one of amount of protrusion to the back surface side, texture, and color.

The texture of the first operation surface 303a and the texture of the second operation surface 303b are different from each other.

The color of the surface of the first operation surface 303a and the color of the surface of the second operation surface 303b are different from each other.

The first operation surface 303a protrudes further to the back surface side of the electronic device 100 than the second operation surface 303b.

The height of the first operation surface 303a in the direction toward the back surface side is greater than the heights of the gripping portions 90 and 300 in the direction toward the back surface side and is lower than the height of the eyepiece portion 16 in the direction toward the back surface side.

The material of the touch operation surface 303 is a glass filler-containing resin.

The length of the first operation surface 303a in the direction of the slide operation is longer than the length in the direction of the slide operation of the gripping portion 300 located on the surface of the electronic device 100 on the back surface side.

Further, the length of the first operation surface 303a in the direction of the slide operation is greater than the width of a rotational operation at which the rotary operation member 73 is rotationally operated.

When viewed from the back surface side of the electronic device 100, the second operation surface 303b, the first operation surface 303a, and the second operation surface 303b are arranged in order from the rotary operation member 73 in the direction orthogonal to the direction of the slide operation.

The length of the first operation surface 303a in the direction orthogonal to the direction of the slide operation is longer than the length of the rotary operation member 73 in the direction orthogonal to the direction of the slide operation on the touch detection surface 302.

The length of each portion of the second operation surface 303b in the direction orthogonal to the direction of the slide operation is shorter than the length of the rotary operation member 73 in the direction orthogonal to the direction of the slide operation on the touch detection surface 302.

The first electrode surface 302a is provided over the first operation surface 303a and the second operation surface 303b provided adjacent to the outer edge of the first operation surface 303a on a protruding portion side in the direction of the slide operation.

The first operation surface 303a protrudes further to the back surface side of the electronic device 100 than the second operation surface 303b.

When viewed from the back surface side of the electronic device 100, the area of the first touch detection region $302a_1$ where the first operation surface 303a and the first electrode surface 302a overlap each other is greater than that of the second touch detection region $302a_2$ where the second operation surface 303b and the first electrode surface 302a overlap each other.

The digital camera 100 includes the second operation member (sub electronic dial) 73 placed adjacent to the operation surface 303 of the first operation member (touch bar) 82 in the direction of the slide operation.

The second operation member 73 is the closest to the N-th electrode surface 302n among the at least two touch electrode surfaces in the direction of the slide operation.

The line segment passing through the midpoints of the short sides of the touch electrode surface of the detection unit 302 and extending in the direction of the slide operation is defined.

In this case, a region of the N-th electrode surface 302n on the side closer to the second operation member 73 with respect to the line segment is a first region.

When a region of the N-th detection surface 302n on the side further from the second operation member 73 is a second region, the surface area of the first region is smaller than the surface area of the second region.

When viewed from the back surface side of the electronic device 100, the first operation surface 303a includes the first touch detection region $302a_1$ where the first operation surface 303a and the touch detection surface 302 overlap each other, and the first touch non-detection region 301a where the first operation surface 303a and the touch detection surface 302 do not overlap each other.

The second operation surface 303b includes the second touch detection region 302a2 where the second operation surface 303b and the touch detection surface 302 overlap each other, and the second touch non-detection region where the second operation surface 303b and the touch detection surface 302 do not overlap each other.

When viewed from the back surface side of the electronic device 100, the second touch non-detection region, the second touch detection region $302a_2$, and the first touch detection region $302a_1$ are placed in order from the protruding portion side in the direction of the slide operation.

The width of the second touch non-detection region in the direction of the slide operation is greater than the width of the second touch detection region $302a_2$ in the direction of the slide operation.

When viewed from the back surface side of the electronic device 100, the first touch indicator 303c is provided in a touch detection region where the first operation surface 303a and the first electrode surface 302a overlap each other.

When viewed from the back surface side of the electronic device 100, the second touch indicator 303d is provided in a touch detection region where the first operation surface 303a and the N-th electrode surface 302n overlap each other.

The first touch indicator 303c is provided in the first touch detection region $302a_1$.

The width of the second touch detection region $302a_2$ in the direction of the slide operation is smaller than the length 303e from the first touch indicator 303c to the second touch detection region $302a_2$.

The second touch indicator 303d is provided over both the touch detection region where the first operation surface 303a and the N-th electrode surface 302n overlap each other and a touch non-detection region where the first operation surface 303a and the N-th electrode surface 302n do not overlap each other.

The area of the second touch indicator 303d provided in the touch detection region is greater than the area of the second touch indicator 303d provided in the touch non-detection region.

The first operation unit 82 overlaps the operation surface of the display unit 28 in the slide direction (the X-direction) and does not overlap the operation surface of the display unit 28 in a direction (the Y-direction) orthogonal to the slide direction.

When viewed from the back surface side of the electronic device 100, the first operation unit 82 is placed at a position recessed to the front surface side (in a Z-direction) with respect to the operation surface of the display unit 28.

In a case where the line segment passing through the midpoints of the short sides of the touch detection surface 302 and extending in the slide direction is defined, a region of the first touch non-detection region 301a on the side further from the display unit 28 with respect to the line segment is a first region.

When a region of the first touch non-detection region 301a on the side closer to the display unit 28 is a second region, then when viewed from the back surface side of the electronic device 100, the width of the first region in the direction orthogonal to the direction of the slide operation is greater than the width of the second region in the direction orthogonal to the direction of the slide operation.

(Description of Assignment Function of Touch Bar 82)

If an operation is not accurately determined according to the intention of an operation of the user, this results in an erroneous operation.

However, depending on the distance from the thumb standby position 300 to the touch bar 82 or the placement relationship between the touch bar 82 and another member on the device, the intention concordance rate may decrease.

For example, the ease of touching the touch bar 82 changes depending on the distance from the thumb standby position 300.

Specifically, it is easy to touch the touch bar 82 near the thumb standby position 300. The closer the touch bar 82 is to the eyepiece portion 16 from the thumb standby position 300, the more stretched the thumb needs to be. Thus, it becomes more difficult to touch the touch bar 82.

Further, as described above, the eyepiece portion 16 is an eyepiece viewfinder for visually confirming an image displayed on the EVF 29 within the eyepiece viewfinder.

For the purpose of securing a comfortable eye point or the purpose of making the nose less likely to come into contact with the display unit 28 in an eye approach state, the eyepiece portion 16 has a protruding shape in which the eyepiece portion 16 protrudes to the exterior side (the back surface side).

In the present exemplary embodiment, the eyepiece portion 16 protrudes by 15 mm or more in the Z-direction with respect to a touch surface of the touch bar 82.

Thus, it is difficult to provide a touch input to the end of the touch bar 82 adjacent to the eyepiece portion 16.

This is more conspicuous particularly in the slide operation, in a case where an input cannot be provided from end to end, the number of steps for changing a setting value decreases.

In the present exemplary embodiment, a relatively large protruding shape having a height of 15 mm or more is illustrated as an example. It is, however, considered that an influence on the operability appears if a protruding shape having a height of approximately 1 mm or more is present.

Further, as described above, the sub electronic dial 73 is a rotary operation member. By rotating the sub electronic dial 73 in the horizontal direction (the X-axis direction) with the right thumb, it is possible to provide an input at a plurality of steps. However, there is a possibility that the right thumb accidentally touches the touch bar 82 adjacent to the sub electronic dial 73 when this operation is performed.

(Description of Detailed Configuration of Touch Bar 82)

Next, the detailed configuration of the touch bar 82 is described.

Figure 4A:
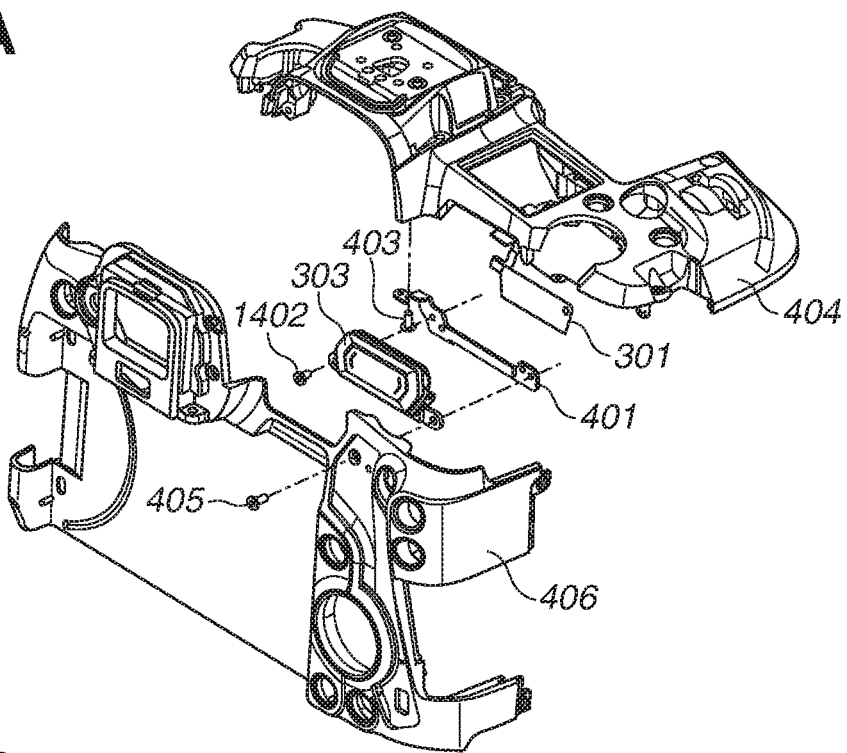
FIG. 4A is an exploded view of the touch bar.

FIG. 4A is an exploded view of the touch bar 82. The touch bar 82 includes the key top 303 as an external appearance component and the printed circuit board 301 including the electrode 302 that performs capacitive touch detection.

In the capacitive touch detection method, the electrode 302 detects capacitance that changes when the finger of the user comes into contact with the key top 303.

Thus, the key top 303 needs to be made of a non-conductive member.

Further, to improve the response of touch detection, it is necessary to make a change in capacitance great. Thus, it is desirable that the permittivity of the non-conductive member of the key top 303 should be high.

Thus, the non-conductive member is made of a material obtained by a non-conductive resin material containing a glass filler having high permittivity.

As illustrated in FIG. 4A, the key top 303 is fixed to a key top fixing member with a screw 1402, and the key top fixing member is fixed together with the key top 303 to the upper cover 404 of the digital camera 100 with a screw 403.

Further, the key top 303 is fixed together with the key top fixing member to the back surface cover 406 of the digital camera 100 with a screw 405.

To improve the electrical noise shielding properties of the digital camera 100, the upper cover 404 and the back surface cover 406 are made of a conductive material.

Figure 4B:
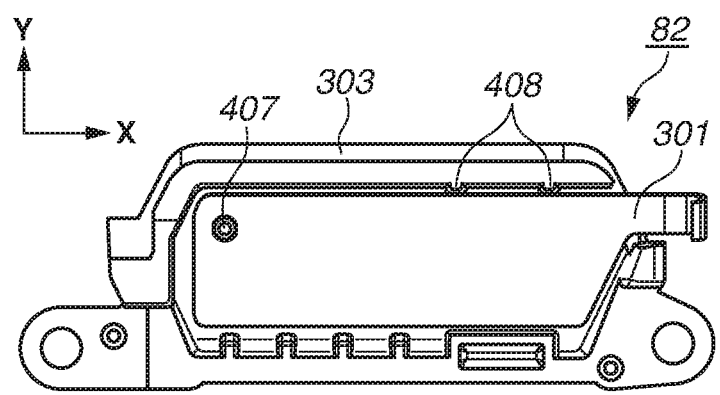
FIG. 4B is a diagram illustrating attachment of a flexible board of the touch bar.

For example, the conductive material is a magnesium alloy or a conductive resin. Next, as illustrated in FIG. 4B, the printed circuit board 301 is pasted to the back side of the key top 303.

On the back side of the key top 303, a boss 407 and ribs 408 are formed.

The printed circuit board 301 is pasted to the key top 303 of the touch bar 82 with double-sided tape (not illustrated) in the state where the boss 407 is fitted to the positioning hole 305 and the printed circuit board 301 is pressed against the ribs 408.

At this time, it is desirable to use thin double-sided tape having a thickness of approximately 50 μm to 100 μm so as not to hinder the detection of the touch sensor.

Consequently, the printed circuit board 301 and the touch sensor electrode 302 to be wired to the printed circuit board 301 can be attached to the key top 303 as an operation surface with high accuracy in a limited region and at a position close to the touch sensor electrode 302.

Figure 4C:
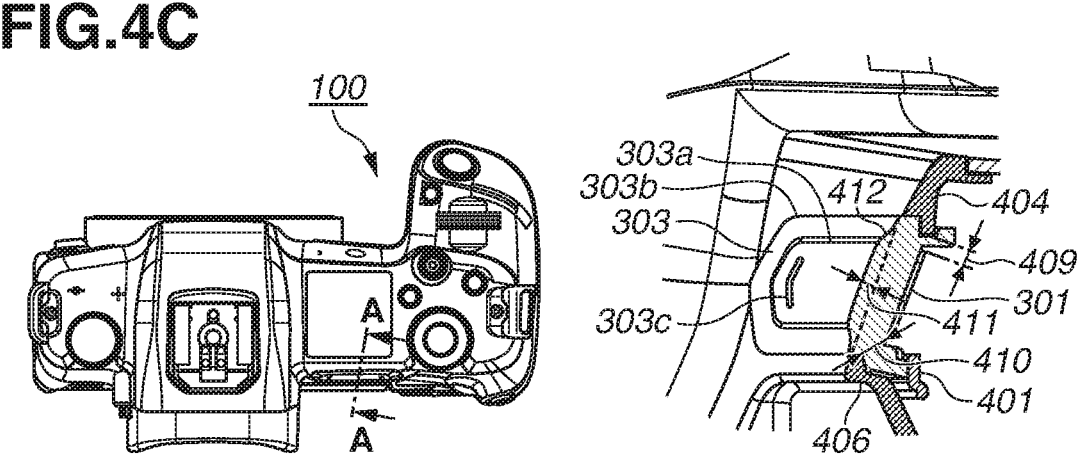
FIG. 4C is a cross-sectional view of the touch bar.

Next, FIG. 4C illustrates a cross-sectional view of the touch bar 82.

As described above, the key top 303 includes a touch detection region contained in the key top visible outline 303*a* and a touch non-detection region between the key top visible outlines 303*a* and 303*b*.

A portion inside the key top visible outline 303*a* is the first operation surface, and a portion outside the key top visible outline 303*a* and inside the key top visible outline 303*b* is the second operation surface (see FIG. 3).

A region where the first operation surface inside the key top visible outline 303*a* and the touch sensor electrode 302 overlap each other is the first touch detection region $302a_1$, and a region where the first operation surface inside the key top visible outline 303*a* and the touch sensor electrode 302 do not overlap each other is the first touch non-detection region 301*a*.

The outer periphery of the first operation surface is surrounded by the second operation surface (see FIG. 3).

A region where the second operation surface and the touch sensor electrode 302 overlap each other is the second touch detection region $302a_2$. A region where the second operation surface and the touch sensor electrode 302 do not overlap each other is the second touch non-detection region (see FIG. 3).

The first operation surface that is a planar surface placed on the back surface of the imaging apparatus 100 protrudes further to the back surface side than the second operation surface surrounding the outer periphery of the first operation surface.

That is, the surface of the first operation surface is located at a position higher than the second operation surface on the back surface side.

This is because, unless a certain distance is provided between the upper cover 404 and the back surface cover 406, which are made of a conductive material, and the touch sensor electrode 302, capacitance for touch detection is discharged to the conductive material, and the output of touch detection decreases.

FIG. 4C illustrates a clearance 409 between the touch sensor electrode 302 and the upper cover 404, and a clearance 410 between the touch sensor electrode 302 and the back surface cover 406.

In the touch sensor electrode 302 according to the present exemplary embodiment, a clearance of at least 1 mm or more is provided, thereby obtaining output required for touch detection.

For the above reason, the key top 303 has the touch non-detection regions around its entire periphery.

However, in a case where the user performs a touch operation on the touch bar 82 while looking into the EVF 29, this operation is performed without viewing the touch bar 82. Thus, it is not possible to distinguish between the touch detection regions and the touch non-detection regions.

Thus, as illustrated in FIG. 4C, the touch detection regions of the key top 303 have a protruding surface shape 411 with respect to the touch non-detection regions, and the touch non-detection regions have a recessed shape 412, whereby it is possible to perform the touch operation without viewing the touch bar 82.

In the present exemplary embodiment, the height of the protruding surface shape 411 of the touch detection regions (the first operation surface) is greater than that of the recessed shape 412 by 1 mm.

The protruding surface shape 411 is higher than the surface of the thumb standby position 300 in the Z-direction so that in a case where the user holds the thumb standby position 300, the user does not easily perform an erroneous operation for touch detection.

Further, the height of the protruding shape 411 of touch detection regions is smaller than the surface of the eyepiece portion 16 in the Z-direction so that when the user looks into the EVF 29 of the eyepiece portion 16, the user does not easily perform an erroneous operation for touch detection.

Further, the surfaces of the touch detection regions of the key top 303 have a smoother texture than that of the touch non-detection regions, and the surfaces of the touch non-detection regions have a rough texture, whereby it is possible to distinguish between the touch detection regions and the touch non-detection regions.

Further, the color of the surfaces of the touch detection regions of the key top 303 is different from that of the touch non-detection regions, thereby increasing the visibility of the touch detection regions.

(Description of Sub Electronic Dial 73)

As in FIGS. 1B and 4A, the sub electronic dial 73 is provided at a position recessed to the front surface side (in the Z-direction) of the imaging apparatus 100 with respect to a touch surface 401 of the touch bar 82.

However, the difference in level in the Z-direction between the touch surface 401 of the touch bar 82 and a contact surface of the sub electronic dial 73 which is rotationally moved with the right thumb is small.

Thus, there is a possibility that when the user operates the sub electronic dial 73, the right thumb accidentally touches the touch bar 82 adjacent to the sub electronic dial 73.

In the present exemplary embodiment, in FIGS. 1B and 4A, the sub electronic dial 73 is provided at a position recessed to the front surface side (in the Z-direction) of the imaging apparatus 100 with respect to the touch surface 401 of the touch bar 82.

Conversely, however, the present invention also includes a form in which the sub electronic dial 73 is provided at a position protruding to the back surface side (in the Z-direction) of the imaging apparatus 100 with respect to the touch surface 401 of the touch bar 82. The reason is as follows.

The difference in level of protrusion to the back surface side (in the Z-direction) between the touch surface 401 of the touch bar 82 and the contact surface of the sub electronic dial 73 which is rotationally moved with the right thumb is small.

Thus, there is a possibility that when the user operates the sub electronic dial 73, the right thumb accidentally touches the touch bar 82 adjacent to the sub electronic dial 73.

The sub electronic dial 73 is a rotary operation member that is rotated in the X-direction about a single rotational axis in the Y-direction.

When viewed from the back surface side of the imaging apparatus (electronic device) 100, the touch bar 82 as the first operation member overlaps the operation surface of the touch panel 28, as the display unit, in the slide direction (the X-direction).

Then, the touch bar 82 as the first operation member does not overlap the operation surface of the touch panel 28, as the display unit, in the direction (the Y-direction) orthogonal to the slide direction.

When viewed from the back surface side of the imaging apparatus (electronic device) 100, the touch bar 82 is placed at a position recessed to the front surface side (in the Z-direction) with respect to the operation surface of the touch panel 28.

However, the difference in level in the Z-direction between the operation surface 303 (the touch surface 401) of the touch bar 82 and the operation surface (a touch surface) of the touch panel 28 is relatively great.

Thus, the possibility that when the user operates the touch panel 28, the finger accidentally touches the touch bar 82 adjacent to the touch panel 28 is low.

In the present exemplary embodiment, the difference in level in the Z-direction between the touch surface 401 of the touch bar 82 and the touch surface of the touch panel 28 is greater than the difference in level in the Z-direction between the touch surface 401 of the touch bar 82 and the contact surface of the sub electronic dial 73 which is rotationally moved.

A line segment A (FIG. 3) passing through the midpoints of the short sides of the touch detection surface of the touch sensor electrode 302 as the detection unit and extending in the slide direction is defined.

In this case, a region of the N-th touch detection surface 302n on the side closer to the second operation member 73 with respect to the line segment A (a center line) is a first region.

Then, when a region of the N-th touch detection surface 302n on the side closer to the display unit (touch panel) 28 is a second region, the surface area of the first region is smaller than the surface area of the second region.

(Description of Linearity)

In the touch sensor electrode 302 according to the present exemplary embodiment illustrated in FIG. 3, dogleg slope shapes are formed in the touch sensor electrode 302b along the touch sensor electrodes 302a and 302c adjacent to the touch sensor electrode 302b.

Consequently, when the slide operation is performed, the input value of capacitance of the touch sensor electrodes 302a to 302c gradually shifts to the adjacent electrodes. Thus, it is possible to perform an operation in which linearity is secured.

In the touch sensor electrode 302 according to the present exemplary embodiment illustrated in FIG. 3, the apexes of the dogleg slope shapes are placed in approximate centers in the Y-direction of the touch sensor electrode 302, and angles θ1 and θ2 of the apexes are set to approximately 90 degrees.

Figure 5A:
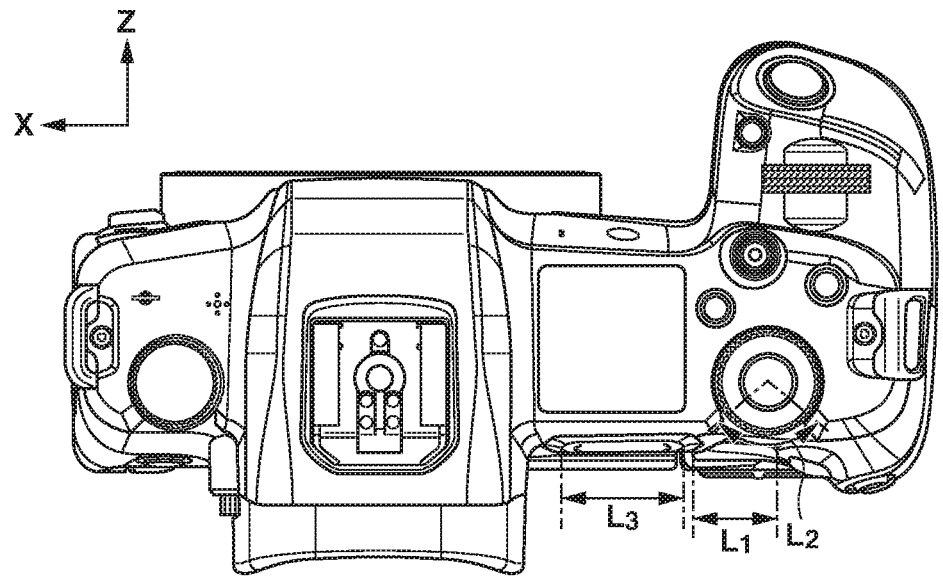
FIG. 5A is a top view of the digital camera.
Figure 5B:
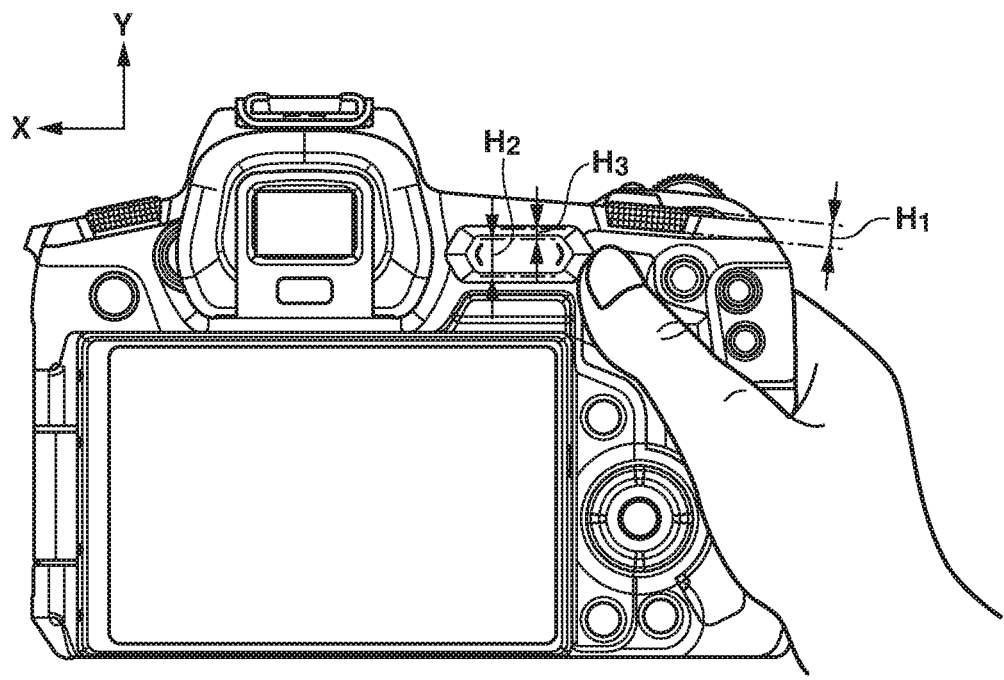
FIG. 5B is a rear view of the digital camera when held.

Next, FIGS. 5A and 5B illustrate the size relationships among the key top 303, the sub electronic dial 73, and the thumb standby position 300, which are adjacent to the key top 303.

As illustrated in FIG. 5A, X-direction widths of these components are as follows. An X-direction width L1 of the thumb standby position 300, an X-direction width L2 of the sub electronic dial 73 and an X-direction width L3 of the touch detection regions of the key top 303 satisfy L1<L2 and L2≤L3.

For example, the average width of the thumb of the Japanese is approximately 20 mm. Thus, assuming that 10 mm, which is half the average width, is the contact area between the thumb and the thumb standby position 300 in a case where the digital camera 100 is held, the X-direction width L1 of the thumb standby position 300 needs to be 5 mm or more.

In a case where the sub electronic dial 73 or the touch bar 82 is operated, unless the slide distance is equal to or greater than twice the contact area of the thumb, the range of a change in a setting value in a single slide operation is small.

Then, it is necessary to repeatedly perform the slide operation.

Thus, the X-direction width L2 of the sub electronic dial 73 and the X-direction width L3 of the touch detection regions of the key top 303 need to be at least 10 mm or more.

Further, the touch bar 82 is given a slide operability equivalent to that of the sub electronic dial 73.

To this end, the X-direction width L3 of the touch detection regions of the key top 303 needs to have a length equivalent to or greater than that of the X-direction width L2 of the sub electronic dial 73.

Further, as illustrated in FIG. 5B, a Y-direction width H1 of the sub electronic dial 73, a Y-direction width H2 of the touch detection regions of the key top 303, and a Y-direction width H3 of the touch non-detection regions satisfy H1≤H2 and H1>H3.

As described above, the touch bar 82 is given a slide operability equivalent to that of the sub electronic dial 73. To this end, the Y-direction width H2 of the touch detection regions of the key top 303 needs to be at least equivalent to or greater than the Y-direction width H1 of the sub electronic dial 73.

Further, the Y-direction width H3 of the touch non-detection regions of the key top 303 needs to be at least smaller than the Y-direction width H1 of the sub electronic dial 73 so that the touch non-detection regions of the key top 303 are not erroneously recognized as the detection regions.

Figure 6A:
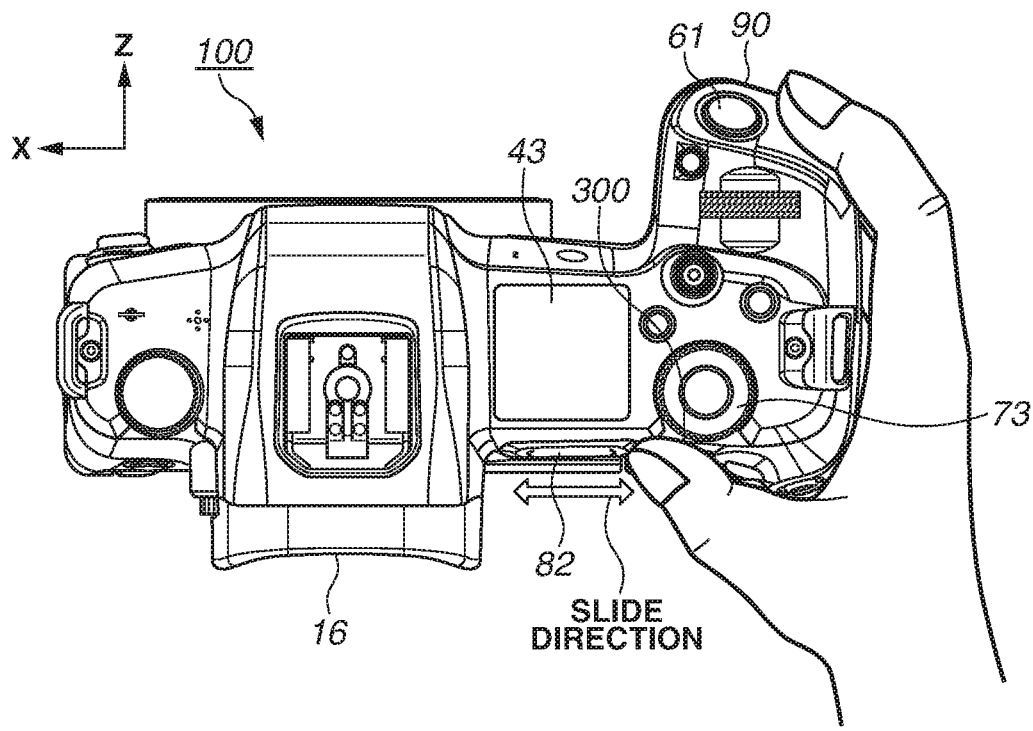
FIG. 6A is a top view of the digital camera when held.
Figure 6B:
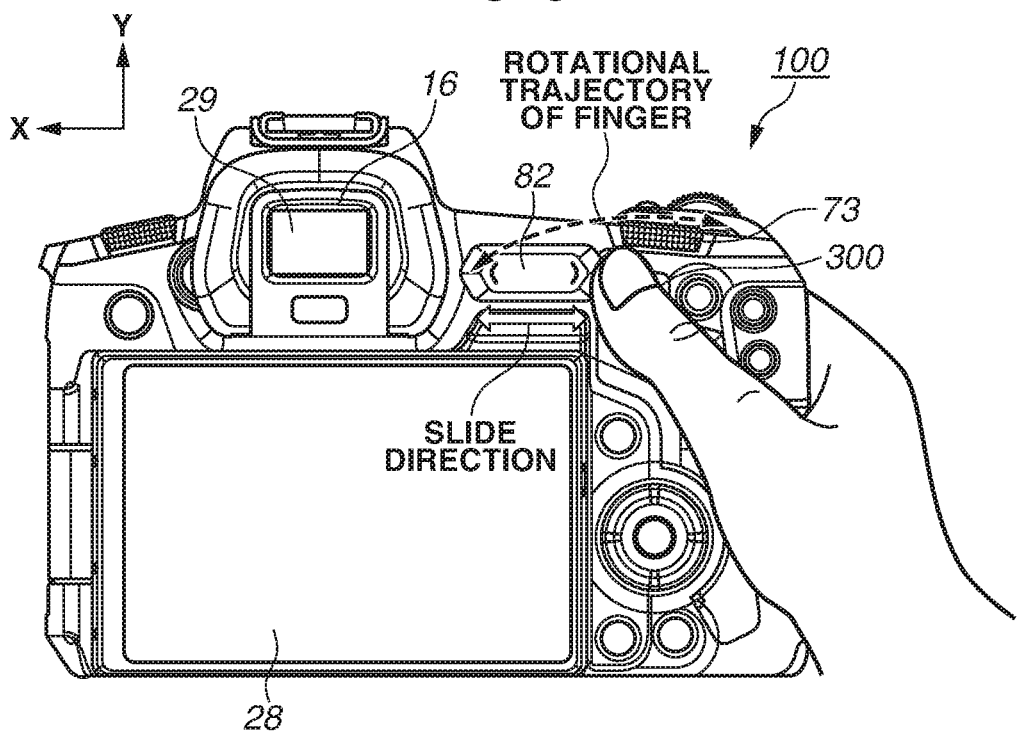
FIG. 6B is a rear view of the digital camera when held.

FIG. 6A is a diagram illustrating the state where the user holds the digital camera 100 as viewed from the upper surface of the digital camera 100. FIG. 6B is a diagram illustrating the state where the user holds the digital camera 100 as viewed from the back surface.

As illustrated in FIG. 6A, generally, the thumb standby position 300 is located at the position where the grip 90 is projected onto the back surface side. Rubber is often pasted to the thumb standby position 300, thereby indicating the position of the thumb standby position 300 and also enhancing grip feeling.

Further, as illustrated in FIG. 6B, the positional relationship between the touch bar 82 and the sub electronic dial 73 is set such that the touch bar 82 and the sub electronic dial 73 are placed on the rotational trajectory of the thumb with the thumb standby position 300 at the center, whereby it is possible to operate the touch bar 82 and the sub electronic dial 73 while gripping the grip 90.

The rotational direction of the sub electronic dial 73 and the direction of the slide operation on the touch bar 82 coincide with the X-direction in FIG. 6B according to the rotational trajectory of the thumb so that the operabilities of the touch bar 82 and the sub electronic dial 73 are similar to each other.

Further, the touch bar 82 is adjacent to the thumb standby position 300.

Thus, as described above, the touch bar 82 is placed so that it is easy for the user to perform a tap operation and a slide operation to the left and right (the slide direction illustrated in FIG. 3) with the right thumb in the state where the user grips the gripping portion 90.

The touch bar 82 can be assigned functions according to operations.

For example, the touch bar 82 can be assigned the function of changing exposure-related setting values can be set using the main electronic dial 71 or the sub electronic dial 73 as an operation member.

The exposure-related setting values are the shutter speed (Tv), the stop value (Av), the International Organization for Standardization (ISO) sensitivity, and an exposure correction value in an automatic exposure mode.

For example, a case will be described where the touch bar 82 is assigned the function of setting the ISO sensitivity.

In a case where the tap operation is performed at a position in the left half of the touch bar 82, the touch bar 82 is assigned the function of setting the imaging ISO sensitivity of the digital camera 100 to a sensitivity one-third step lower.

In a case where the tap operation is performed at position coordinates in the right half, the touch bar 82 is assigned the function of setting the imaging ISO sensitivity to a sensitivity one-third step higher.

Further, in a case where the slide operation is performed, the touch bar 82 is assigned the function of increasing or decreasing the imaging ISO sensitivity of the digital camera 100 by a one-third step with each step of the slide.

These functions to be assigned can be customized by the user, and for example, the following change can be made. In a case where the tap operation is performed at a position in the left half, the touch bar 82 is assigned the function of setting the imaging ISO sensitivity of the digital camera 100 to an automatic setting.

Further, the following change can be made. In a case where the tap operation is performed at position coordinates in the right half, the touch bar 82 is assigned the function of setting the imaging ISO sensitivity to the highest ISO sensitivity.

Further, the touch bar 82 can also be assigned a white balance setting, the setting of an AF mode, the setting of a drive mode, and reproduction image advancement in addition to the exposure-related setting values.

Further, in the moving image capturing mode, the touch bar 82 can be assigned the function of adjusting the recording level of a microphone and fast-forwarding and fast-rewinding functions for moving image reproduction.

As described above, the touch bar 82 enables the operations of various functions. However, to operate the various functions set for the touch bar 82 by recognizing the various functions, it is necessary to operate the various functions while viewing a display screen placed in the digital camera 100.

Figure 7A:
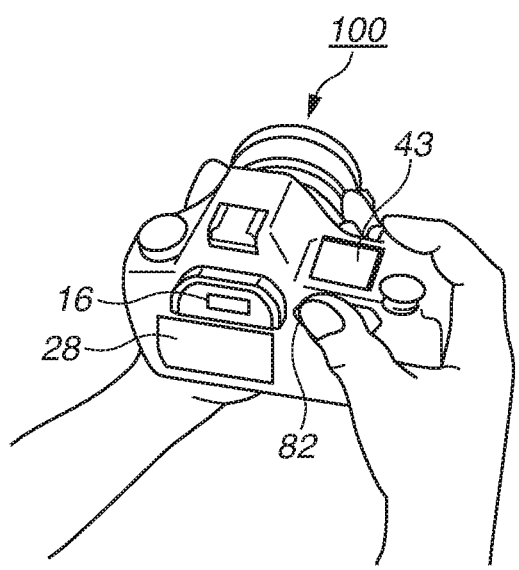
FIGS. 7A and 7B are schematic diagrams illustrating a state where the touch bar is operated by a user.

FIG. 7A illustrates a schematic diagram of the state where the user operates the touch bar 82 while viewing the display unit 28 provided on the back surface of the camera 100 or the outside-viewfinder display unit 43 provided on the upper surface of the camera 100.

Figure 7B:
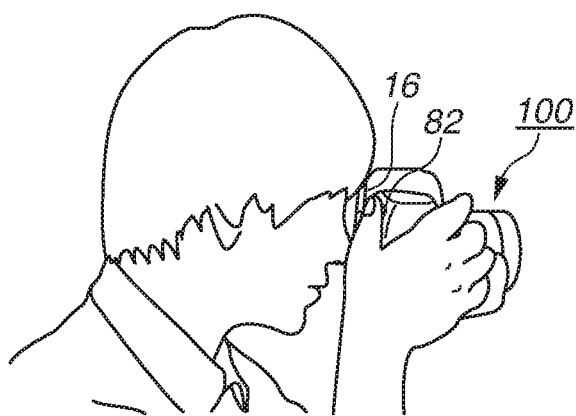

Further, FIG. 7B illustrates a schematic diagram of the state where the user operates the touch bar 82 while viewing the EVF 29 in the eyepiece viewfinder.

In the case of a camera including a plurality of display units as in FIGS. 7A and 7B, the user captures an image and sets an image capturing function in various styles. Thus, the touch bar 82 needs to be placed at the position where it is easy for the user to operate the touch bar 82 no matter which of the display units the user views during the operation.

Figure 8A:
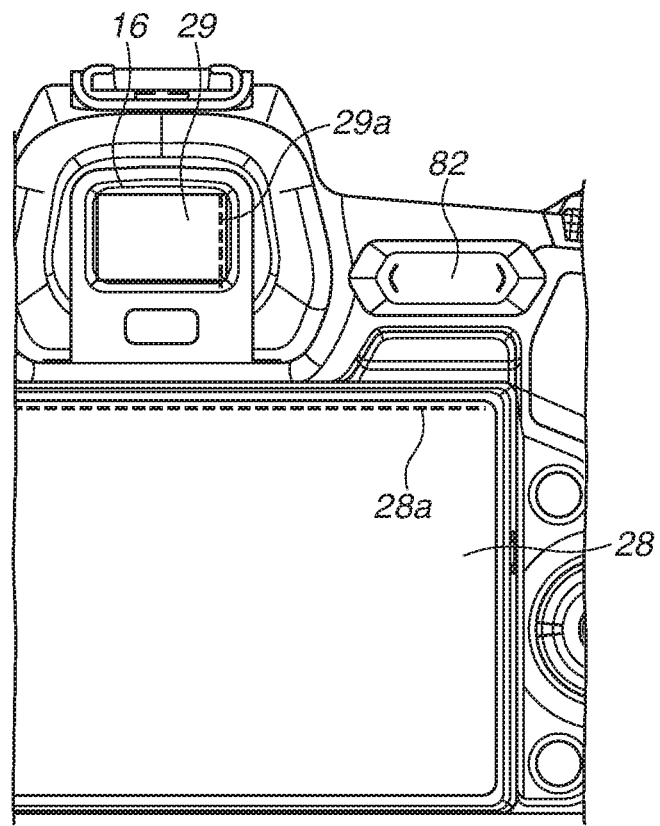
FIGS. 8A and 8B are schematic diagrams illustrating positional relationships among the touch bar and display units.
Figure 8B:
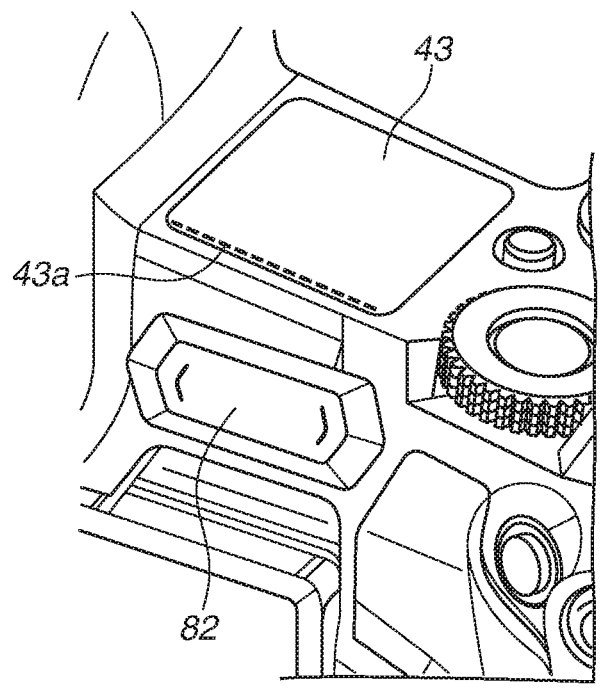

FIGS. 8A and 8B are schematic diagrams illustrating the positional relationships among the plurality of display units and the touch bar 82, which are the features of the present invention.

FIG. 8A illustrates the positional relationships among the touch bar 82 and the display unit 28, which are provided on the back surface of the camera 100, and the EVF 29 in the eyepiece viewfinder. FIG. 8B illustrates the positional relationship between the touch bar 82 and the outside-viewfinder display unit 43, which is provided on the upper surface of the camera 100.

As illustrated in FIG. 8A, the touch bar 82 is placed adjacent to an upper side 28a of the display unit 28 and a right side 29a of the EVF 29.

Further, as illustrated in FIG. 8B, the touch bar 82 is placed adjacent to a lower side 43a of the outside-viewfinder display unit 43.

The touch bar 82 is thus placed, surrounded by the display units, whereby the user can operate the touch bar 82 while recognizing the display screens and the touch operation no matter which of the display units the user views during the operation as illustrated in FIGS. 7A and 7B.

Particularly, a professional photographer or a camera user called an advanced amateur often quickly makes an image capturing setting while viewing the EVF 29 or the outside-viewfinder display unit 43.

Thus, based on the placement of the touch bar 82 according to the present invention, it is possible to perform the action of looking into a display unit and a touch operation as a series of operations.

Figure 9B:
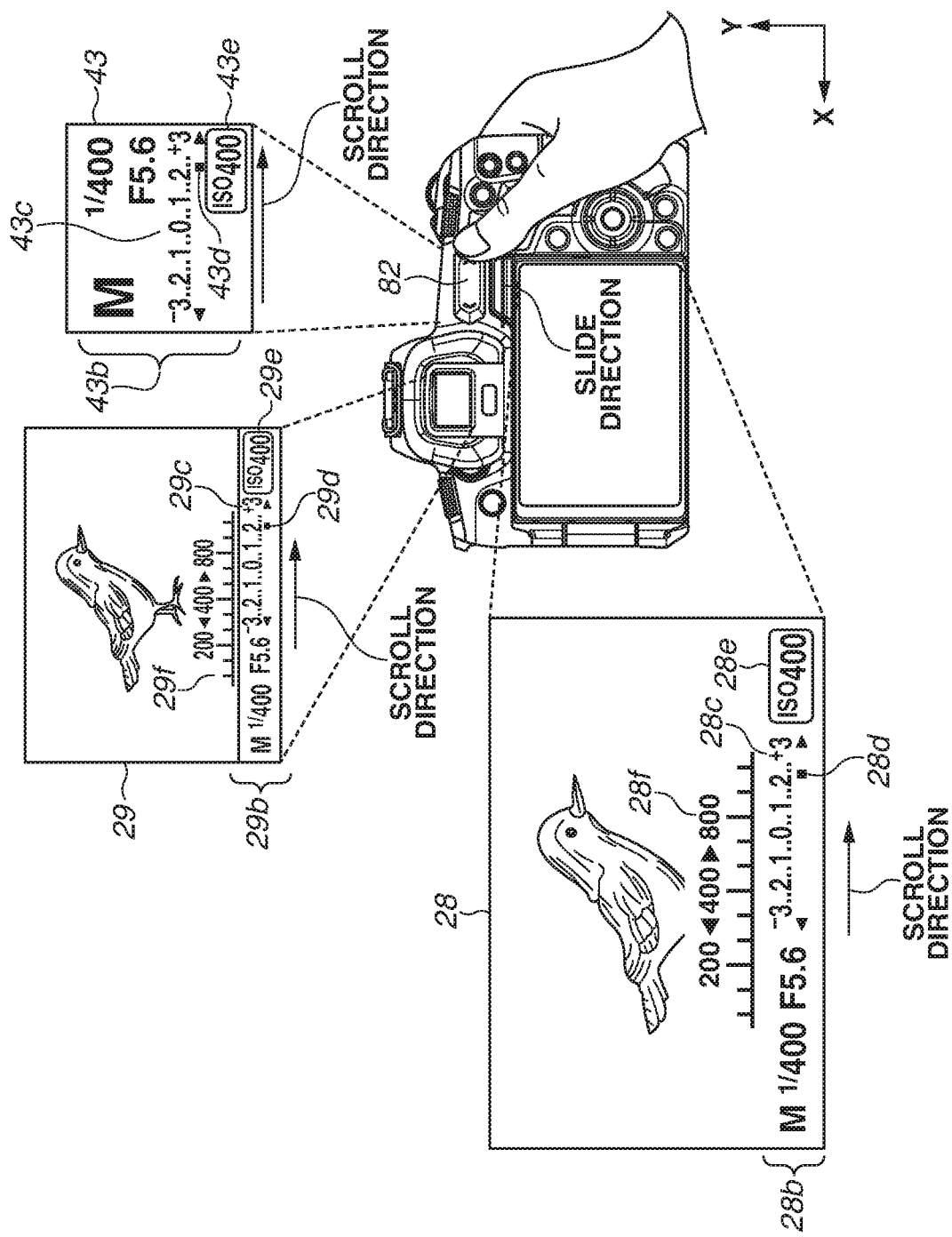

Next, FIGS. 9A and 9B are schematic diagrams illustrating the relationships between the display screens of the display units and the slide direction on the touch bar 82. FIG. 9A illustrates the display screens on which exposure-related image capturing setting values are displayed.

On the display unit 28 provided on the back surface of the camera 100, image capturing setting values are arranged next to each other in the X-direction in a lower portion 28b of the display screen.

Generally, a captured image is of such a size that the captured image is long in the X-direction (horizontally long). The ratio between the long and short sides (the aspect ratio) of the captured image is 3:2 or 4:3.

Thus, the display unit 28 and the EVF 29, on which reproduction display or LV display of a captured image is performed, are long in the X-direction according to the aspect ratio of a captured image.

On the display unit 28, to prevent an object image and display from overlapping each other when LV display is performed as in FIG. 9A, and to display all the image capturing setting values in a line, the setting values are arranged next to each other in the X-direction in the lower portion 28b of the display screen.

Particularly, an exposure meter 28c indicating a photometric value in a manual exposure mode or a correction value in the automatic exposure mode has a long display width, and therefore, the values of the exposure meter 28c are not adequate to be displayed next to each other in the Y-direction.

An exposure meter cursor 28d indicating the photometric value or the correction value of the exposure meter 28c scrolls in the X-direction on the meter 28c if the setting value is changed.

In the present invention, the movement of a cursor indicating a setting value and the switching of the display of a setting value by a slide are referred to as a scroll, and the direction of the scroll is defined as a scroll direction.

A setting value the setting of which can be changed is selected by a setting value selection cursor 28e, and the setting selected by the cursor can be changed using the main electronic dial 71 or the sub electronic dial 73 as an operation member, or the touch bar 82.

Similarly to the display unit 28, setting values including an exposure meter 29c and an exposure meter cursor 29d, and a setting value selection cursor 29e are displayed next to each other in the X-direction in a lower portion 29b of the display screen of the EVF 29.

The outside-viewfinder display unit 43 does not display a captured image, and displays only setting values. Thus, setting values and a setting value selection cursor 43e are not displayed next to each other.

However, the display directions of an exposure meter 43c and an exposure meter cursor 43d on the outside-viewfinder display unit 43 are the X-direction in line with the exposure meters on the display unit 28 and the EVF 29.

Thus, in a case where the exposure correction value is changed in the automatic exposure mode by performing the slide operation on the touch bar 82, the exposure meter cursor of the exposure meter on each display unit scrolls in the X-direction.

Further, also in a case where the shutter speed (Tv), the stop value (Av), or the ISO sensitivity is changed using the touch bar 82 in the manual exposure mode, the exposure meter cursor of the exposure meter on each display unit scrolls in the X-direction.

Thus, the direction of the slide operation on the touch bar 82 is made the same as the scroll direction of each exposure meter cursor, whereby the user can perform the slide operation in association with the movement of the exposure meter cursor.

FIG. 9B illustrates a schematic diagram in a case where the ISO sensitivity is changed using the touch bar 82.

The setting value selection cursors (28e, 29e, and 43e) on the display units are in the state where the item of the ISO sensitivity is selected. Thus, the setting can be changed using the touch bar 82.

If the user brings the thumb into contact with the touch bar 82 and starts the slide operation, ISO sensitivity meters 28f and 29f are displayed on the display unit 28 and the EVF 29, respectively.

If the user slides the thumb on the touch bar 82 to the right side in the X-direction, the display of the ISO sensitivity meters 28f and 29f scrolls to the right side in the X-direction, and the ISO sensitivity is changed from an ISO of 100 to an ISO of 400.

Then, the exposure value increases by two steps according to the change in the ISO sensitivity. Thus, the exposure meter cursors (28d, 29d, and 43d) of the exposure meters on the display units scroll to the right side in the X-direction.

Also if the shutter speed (Tv) or the stop value (Av) is changed using the touch bar 82, similarly, the meters of setting values are displayed and scroll in the X-direction.

As described above, the scroll directions of the exposure meter cursors and the display of the meters of setting values on the display units and the direction of the slide operation on the touch bar 82 are made the same as each other.

Thus, the user can intuitively change various settings using the touch bar 82 while viewing the display units.

In the present exemplary embodiment, the direction of the slide operation on the touch bar 82 is the X-direction. The direction of the slide operation on the touch bar 82, however, only needs to be the same as the scroll directions of the display of the meters of setting values displayed on the display units, and therefore is not limited to the X-direction.

Further, in the present exemplary embodiment, the positional relationship between the EVF 29 and the touch bar 82 has been described.

The present invention is not limited to this, and can also be carried out using a transmissive liquid crystal display unit superimposed on a focusing screen in an optical viewfinder including a mirror, a pentaprism, and the focusing screen. Thus, the present invention is not limited to the eyepiece viewfinder including the EVF 29.

For example, a description has been given above considering the size of the touch sensor electrode in terms of a planar surface area. Alternatively, the ease of providing an input may be adjusted considering the touch sensor electrode as a three-dimensional shape such as a curved surface shape or an uneven shape.

(Another Example of Shape of Touch Sensor Electrode)

Further, the touch sensor electrode 302a is so shaped as to stick out further to the eyepiece portion 16 side than the first operation surface indicated by the key top visible outline 303a.

However, even if the touch sensor electrode 302a sticks out in the direction orthogonal to the slide direction on the key top 303, it is possible to increase the touch sensor output of the touch sensor electrode 302a.

Figure 15:
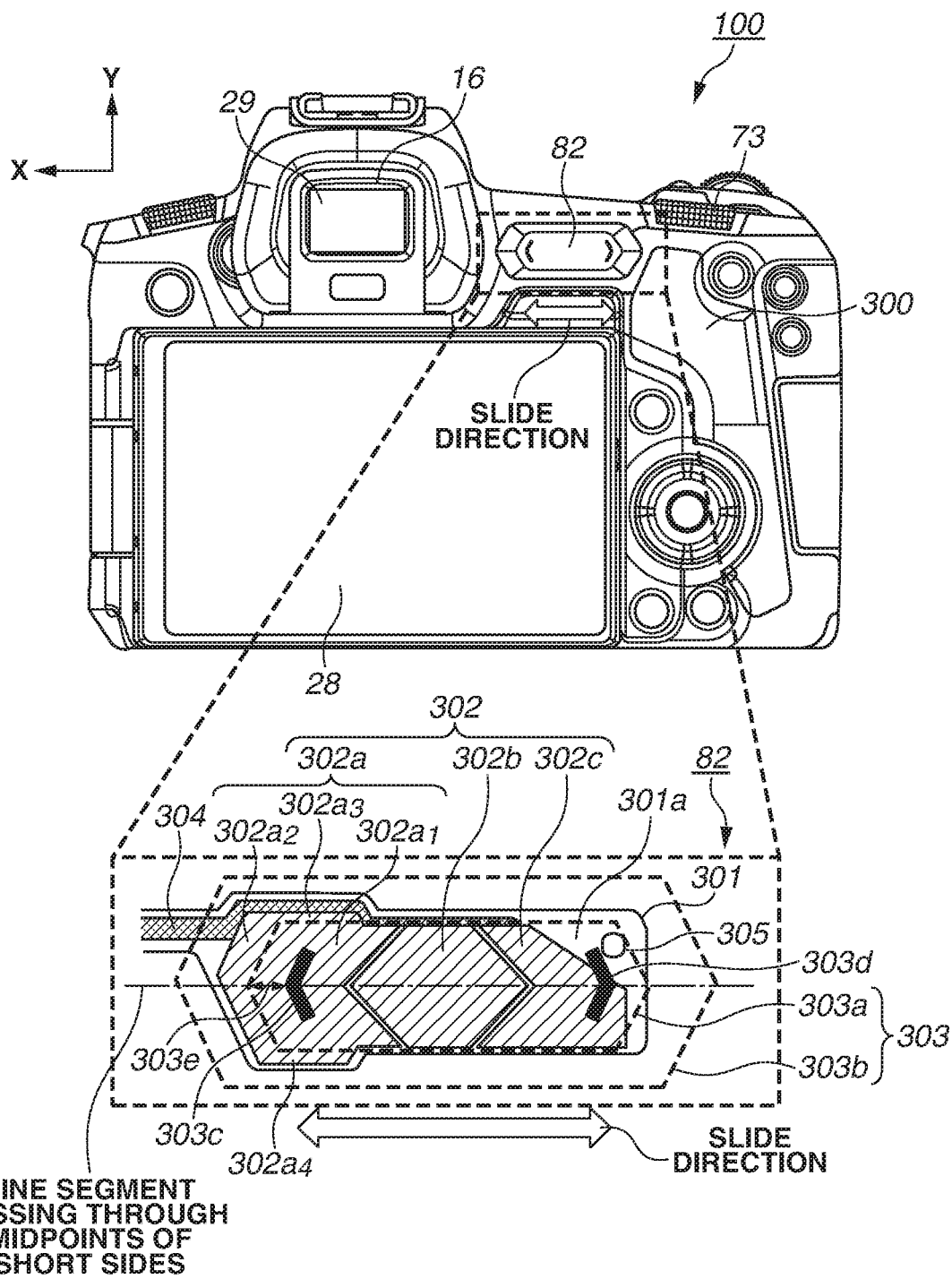
FIG. 15 is a rear view of the digital camera and a diagram illustrating another internal configuration of the touch bar.

FIG. 15 illustrates a rear view of the digital camera 100 and the internal configuration of the touch bar 82 in a case where the touch sensor electrode 302a sticks out of the key top visible outline 303a in the direction orthogonal to the slide direction on the key top 303.

A touch sensor electrode $302a_3$ is a region sticking out in the up direction of the digital camera 100. A touch sensor electrode 302a4 is a region sticking out in the lower direction of the digital camera 100.

As described above, the touch sensor output increases according to the ratio between the areas of the thumb of the user and the touch sensor electrode opposed to the thumb. Thus, it is possible to obtain more stable touch sensor output of the touch sensor electrode 302a.

While desirable exemplary embodiments of the present invention have been described above, the present invention is not limited to these exemplary embodiments, but can be modified and changed in various manners within the scope of the present invention.

The electronic device according to the present invention is not limited to a digital camera serving as an imaging apparatus. The electronic device according to the present invention can also be applied to a copying machine, a laser beam printer (LBP), and an inkjet printer.

The touch bar according to the present invention may be used in a touch operation surface for changing the number of copies or the size of a copy sheet by performing a touch operation and a slide operation while gripping a monitor.

Further, the electronic device according to the present invention can also be applied to mobile devices that are small-sized mobile computers such as a smartphone, a tablet computer, and a smartwatch.

The touch bar according to the present invention can be placed outside the screen of each mobile device, thereby enabling a touch operation and a slide operation for image advancement or selection.

Further, the electronic device according to the present invention can also be applied to an automobile, a medical device, and a game.

The touch bar according to the present invention can be placed in a steering unit of the automobile so that a menu can be switched by a touch operation, a sound volume can be fine-adjusted by a slide operation, and an image on an automotive navigation screen can be reduced and enlarged while steering operation is performed.

Further, the touch bar according to the present invention can be placed in a gripping portion of a handy X-ray device as the medical device, whereby it is possible to fine-adjust an operation by a slide operation.

According to the present invention, a smooth touch operation and a smooth slide operation can be achieved on a touch operation surface placed near a protruding portion protruding to a back surface side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-125512, filed Jun. 29, 2018, and No. 2019-092371, filed May 15, 2019, which are hereby incorporated by reference herein in their entirety.

What is claimed is:

1. An electronic device comprising:
a first operation unit including a touch operation surface on which a touch operation and a slide operation are performed;
a touch detection surface placed inside the touch operation surface and configured to detect the touch operation;
a protruding portion protruding from the touch operation surface in a direction orthogonal to the direction of the slide operation, and
a gripping portion configured to be held by a user,
wherein the touch detection surface is divided into at least two detection surfaces including a first detection surface to an N-th detection surface in order from a side distant from the gripping portion in a direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface,
wherein the first detection surface is provided over the second operation surface provided on the outer edge of the first operation surface on the protruding portion side,
wherein the first and second operation surfaces are different from each other in at least one of amount of protrusion, texture, and color, and
wherein the first detection surface is provided over the second operation surface provided on the outer edge of the first operation surface on the side distant from the gripping portion.

2. The electronic device according to claim 1, wherein the protruding portion is an eyepiece portion.

3. The electronic device according to claim 1, wherein the first detection surface is provided over the first operation surface and the second operation surface provided on the outer edge of the first operation surface on the protruding portion side in the direction of the slide operation.

4. The electronic device according to claim 1, wherein the first detection surface is provided over the first operation surface and the second operation surface provided on the outer edge of the first operation surface on the protruding portion side in the direction orthogonal to the direction of the slide operation.

5. An electronic device comprising:
a first operation unit including a touch operation surface on which a touch operation and a slide operation are performed;
a second operation unit placed adjacent to the touch operation surface of the first operation unit in the direction of the slide operation;
a touch detection surface placed inside the touch operation surface and configured to detect the touch operation; and
a gripping portion configured to be held by a user,
wherein the touch detection surface is divided into at least two detection surfaces including a first detection surface to an N-th detection surface in order from a side distant from the gripping portion in a direction of the slide operation,
wherein the second operation unit is provided the closest to the N-th detection surface among the at least two touch detection surfaces in the direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface,
wherein the first and second operation surfaces are different from each other in at least one of amount of protrusion, texture, and color,
wherein the first detection surface is provided over the second operation surface provided on the outer edge of the first operation surface on the side distant from the gripping portion, and
wherein in a case where a line segment passing through midpoints of short sides of the touch detection surface of a detection unit and extending in the direction of the slide operation is defined, if a region of the N-th detection surface on a side closer to the second operation unit with respect to the line segment is defined as a first region, and a region of the N-th detection surface on a side further from the second operation unit is defined as a second region, a surface area of the first region is smaller than a surface area of the second region.

6. An electronic device comprising:
a first operation unit including a touch operation surface on which a touch operation and a slide operation are performed;
a touch detection surface placed inside the touch operation surface and configured to detect the touch operation; and
a gripping portion configured to be held by a user,
wherein the touch detection surface is divided into at least two detection surfaces including a first detection surface to an N-th detection surface in order from a side distant from the gripping portion in a direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface,
wherein the first and second operation surfaces are different from each other in at least one of amount of protrusion, texture, and color,
wherein the first detection surface is provided over the second operation surface provided on the outer edge of the first operation surface on the side distant from the gripping portion,
wherein the first operation surface includes a first touch detection region where the first operation surface and the touch detection surface overlap each other, and a first touch non-detection region where the first operation surface and the touch detection surface do not overlap each other, and
wherein the second operation surface includes a second touch detection region where the second operation surface and the touch detection surface overlap each other, and a second touch non-detection region where the second operation surface and the touch detection surface do not overlap each other.

7. The electronic device according to claim 6, wherein on the touch operation surface, the second touch non-detection region, the second touch detection region, and the first touch detection region are placed in order from a protruding portion side in the direction of the slide operation, and
wherein a width of the second touch non-detection region in the direction of the slide operation is greater than a width of the second touch detection region in the direction of the slide operation.

8. An electronic device comprising:
a first operation unit including a touch operation surface on which a touch operation and a slide operation are performed;
a touch detection surface placed inside the touch operation surface and configured to detect the touch operation; and
a gripping portion configured to be held by a user,
wherein the touch detection surface is divided into at least two detection surfaces including a first detection surface to an N-th detection surface in order from a side distant from the gripping portion in a direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface,
wherein the first and second operation surfaces are different from each other in at least one of amount of protrusion, texture, and color,
wherein the first detection surface is provided over the second operation surface provided on the outer edge of the first operation surface on the side distant from the gripping portion,
wherein a first touch indicator is provided in a touch detection region where the first operation surface and the first detection surface overlap each other, and
wherein a second touch indicator is provided in a touch detection region where the first operation surface and the N-th detection surface overlap each other.

9. The electronic device according to claim 8, wherein the first touch indicator is provided in a first touch detection region, and
wherein a width of a second touch detection region in the direction of the slide operation is smaller than a length from the first touch indicator to the second touch detection region.

10. The electronic device according to claim 8, wherein the second touch indicator is provided over both the touch detection region where the first operation surface and the N-th detection surface overlap each other, and a touch non-detection region where the first operation surface and the N-th detection surface do not overlap each other, and
wherein a surface area of the second touch indicator provided in the touch detection region is greater than a surface area of the second touch indicator provided in the touch non-detection region.

11. An electronic device comprising:
a first operation unit including a touch operation surface on which a touch operation and a slide operation are performed;
a touch detection surface placed inside the touch operation surface and configured to detect the touch operation;
a display unit configured to display an image recorded in a recording medium, and including an operation surface on which a slide operation and a tap operation can be performed; and
a gripping portion configured to be held by a user,
wherein the touch detection surface is divided into at least two detection surfaces including a first detection surface to an N-th detection surface in order from a side distant from the gripping portion in a direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface,
wherein the first and second operation surfaces are different from each other in at least one of amount of protrusion, texture, and color,
wherein the first detection surface is provided over the second operation surface provided on the outer edge of the first operation surface on the side distant from the gripping portion,
wherein the first operation unit and the operation surface of the display unit are arranged in a direction orthogonal to the direction of the slide operation, and
wherein the first operation unit is placed at a position recessed in the direction orthogonal to the direction of the slide operation with respect to the operation surface of the display unit.

12. The electronic device according to claim 11, wherein in a case where a line segment passing through midpoints of short sides of the touch detection surface and extending in the direction of the slide operation is defined, if a region of a first touch non-detection region on a side further from the display unit with respect to the line segment is defined as a first region, and a region of the first touch non-detection region on a side closer to the display unit is defined as a second region, a width of the first region in the direction orthogonal to the direction of the slide operation is greater than a width of the second region in the direction orthogonal to the direction of the slide operation.

13. An electronic device comprising:
a first operation unit including a touch operation surface on which a touch operation and a slide operation are performed;
a touch detection surface placed inside the touch operation surface and configured to detect the touch operation; and
a gripping portion configured to be held by a user,
wherein the touch detection surface is divided into at least two detection surfaces including a first detection surface to an N-th detection surface in order from a side distant from the gripping portion in a direction of the slide operation,
wherein the gripping portion is provided the closest to the N-th detection surface among the at least two touch detection surfaces in the direction of the slide operation,
wherein the touch operation surface includes a first operation surface, and a second operation surface provided on an outer edge of the first operation surface, wherein the first and second operation surfaces are different from each other in at least one of amount of protrusion, texture, and color, wherein the first detection surface is provided over the second operation surface provided on the outer edge of the first operation surface on the side distant from the gripping portion, and wherein an area of a detection region of the first detection surface present on the second operation surface is greater than an area of a detection region of the N-th detection surface present on the second operation surface.

\* \* \* \* \*